US00RE40240E

(19) United States
(12) Reissued Patent
Gushima et al.

(10) Patent Number: US RE40,240 E
(45) Date of Reissued Patent: Apr. 15, 2008

(54) INFORMATION RECORDING/ REPRODUCING DEVICE USING OPTICAL DISK AND METHOD THEREFOR AND INFORMATION RECORDING SYSTEM AND INFORMATION RECORDING METHOD

(75) Inventors: Toyoji Gushima, Osaka (JP); Toshiya Akagi, Osaka (JP); Chikashi Inokuchi, Osaka (JP)

(73) Assignee: Matsushita Electric Industrial Co., Ltd., Osaka (JP)

(21) Appl. No.: 11/493,013

(22) PCT Filed: Jul. 26, 2000

(86) PCT No.: PCT/JP00/04960

§ 371 (c)(1),
(2), (4) Date: May 9, 2001

(87) PCT Pub. No.: WO01/09890

PCT Pub. Date: Feb. 8, 2001

Related U.S. Patent Documents

Reissue of:
(64) Patent No.: 6,975,570
Issued: Dec. 13, 2005
Appl. No.: 09/806,329
Filed: May 9, 2001

(30) Foreign Application Priority Data

Jul. 29, 1999 (JP) ..... 11-215129

(51) Int. Cl.
*G11B 7/00* (2006.01)

(52) U.S. Cl. ..... 369/47.31; 369/53.21

(58) Field of Classification Search ..... 369/47.1, 369/47.27, 47.28, 47.31, 47.48, 53.21, 82, 369/83, 44.27, 44.28

See application file for complete search history.

(56) References Cited

U.S. PATENT DOCUMENTS

| | | | |
|---|---|---|---|
| 5,577,013 | A | 11/1996 | Kobunaya |
| 5,623,468 | A | 4/1997 | Takeda et al. |
| 6,781,939 | B2 | 8/2004 | Tanoue et al. |

FOREIGN PATENT DOCUMENTS

| | | | |
|---|---|---|---|
| EP | 0634747 | A2 | 1/1995 |
| EP | 0866456 | A1 | 9/1998 |
| EP | 0 866 456 | | 9/1998 |
| EP | 0866456 | A1 * | 9/1998 |
| EP | 0 872 830 | | 10/1998 |
| EP | 0875891 | A2 | 11/1998 |
| EP | 1 018 734 | | 7/2000 |
| EP | 1 031 979 | | 8/2000 |

(Continued)

OTHER PUBLICATIONS

Patent Abstracts of Japan, vol. 013, No. 495 (P–956), Nov. 9, 1989 & JP 01 196775 A (Sony Corp), Aug. 8, 1989.

Patent Abstracts of Japan, vol. 018, No. 379 (P–1771), Jul. 15, 1994 & JP 06 103577 A (Hitachi Maxell Ltd), Apr. 15, 1994.

*Primary Examiner*—Nabil Hindi
(74) *Attorney, Agent, or Firm*—Wenderoth, Lind & Ponack, L.L.P.

(57) ABSTRACT

The sector synchronism of a timing generation section for generating data recording/reproducing timing is corrected at the address-mark detection timing of an address-mark detection section. Moreover, even if only one piece of address information having no error is not reproduced in the sector concerned, when at least one piece of address information having no error is reproduced in any of a predetermined number of sectors preceding the subject sector and at least one address mark is detected in the subject sector, the data recording/reproducing is permitted, and thus, the data is recorded/reproduced at a high speed and a high reliability even if an error rate of a physical address is deteriorated.

32 Claims, 18 Drawing Sheets

FOREIGN PATENT DOCUMENTS

| | | |
|---|---|---|
| JP | 5-120805 | 5/1993 |
| JP | 5-298832 | 11/1993 |
| JP | 6-176501 | 6/1994 |
| JP | 7-111035 | 4/1995 |
| JP | 7 272411 | 10/1995 |
| JP | 10-293927 | 11/1998 |
| JP | 2000-030359 | 1/2000 |
| WO | 98/14938 | 4/1998 |

* cited by examiner

INFORMATION RECORDING/ REPRODUCING DEVICE USING OPTICAL DISK AND METHOD THEREFOR AND INFORMATION RECORDING SYSTEM AND INFORMATION RECORDING METHOD

Matter enclosed in heavy brackets [ ] appears in the original patent but forms no part of this reissue specification; matter printed in italics indicates the additions made by reissue.

*This application is a reissue of U.S. Pat. No. 6,975,570, issued Dec. 13, 2005.*

BACKGROUND OF THE INVENTION 1. Field of the Invention

The present invention relates to an information recording reproducing apparatus and method for recording and/or reproducing information. More particularly, the present invention relates to an optical-disk recording apparatus and method for recording information in an optical disk serving as a recording medium, an optical-disk reproducing apparatus and method for reproducing information from an optical disk, and an information recording system and method using an optical-disk recording apparatus in combination with an external unit. 2. Description of the Background Art An optical disk has gained attention as a large-capacity information-recording medium, and the development and commodification of the optical disk has progressed as an external memory device of a computer or an audiovisual recording medium. In general, an optical disk has spiral or concentric tracks formed on the disk surface. and records or reproduces information by applying a laser beam along the tracks. Moreover, each track is further divided into a plurality of sectors respectively serving as the minimum unit for recording or reproducing information data. Address information is previously recorded in each sector so that a position on a disk can be univocally specified and a recording/reproducing apparatus makes it possible to record or reproduce information in sector units by reading address information from the disk.

FIG. 18 is an illustration showing a data format in a sector of a rewritable optical disk having been recently practically used in a case of a DVD-RAM as an example. As shown in FIG. 18, a sector 1001 includes a header field 1002 and a data recording field 1003. The header field 1002 has an address field 1004 and a mirror field 1005 and the address field 1004 is further divided into four address-fields, that is, first to fourth address-fields 1004a, 1004b, 1004c, and 1004d. Each address-field is constituted of address VFO fields VFOa, VFOb, VFOc, and VDOd (hereafter referred to as VFO field), address mark fields AMa, AMb, AMc, and AMd (hereafter referred to as AM), address information fields PIDa, PIDb, PIDc, and PIDd (hereafter referred to as PID), error detection code: fields IEDa, IEDb, IEDc, and IEDd (hereafter referred to as IED), and, postamble fields PAa, PAb, PAc, and PAd (hereafter referred to as PA) from the head in order. The data-recording field 1003 is constituted of a gap field 1006, front guard field 1007, data VFO field 1008, pre-sync code field 1009, data field 1010, data postamble field 1011, rear guard field 1012, and buffer field 1013.

The contents and functions of each of the above fields are briefly described below. First, the header field 1002 is an field for univocally specifying the position of each sector

1001 (that is, address) on an optical disk, in which a pattern for recognizing an address by a recording/reproducing apparatus is recorded by previously forming an irregular pit shape in each field to be mentioned below. A single pit pattern for quickly performing lead-in of PLL in a reproductive system of the apparatus is recorded in the VFO field (VFO) among fields constituting the address fields 1004a to 1004d of the header field 1002. The single pit pattern uses, for example, a continuous pattern of 4T-mark·4T-space. Here, "T" denotes a channel bit cycle, "mark" denotes a pit, that is, a concave portion, and "space" denotes a mirror, that is, a convex portion. In this case, it is also permitted to reverse definitions of a mark and a space.

A specific pattern showing a start of address information is recorded in the address mark field (AM) and is used to correctly make bite synchronization of each of the address information fields (PID) immediately after in the apparatus. Address information is recorded in the address information field (PID). The address information includes at least an address number for univocally specifying the position of each sector on an optical disk and moreover, includes additional information showing the attributes of sectors and an nth address information field among four address information fields in each sector.

An error detection code (parity) is recorded in the error detection code field (IED) for detecting a bite error in the address information field (PID) immediately before. For example, a Reed-Solomon code or cyclic code is used as an error detection code, and address information error detection coded data is reproduced by adding an error detection code to address information, and by passing through an error detecting circuit a pattern of the reproduced address information error detection coded data (i.e., address information PID+error detection code IED), it is possible to easily detect an error included in the pattern. A specific pattern which indicates an end terminal of each address field is recorded in the postamble fields (PA).

A modulation code obtained by modulating address information and binary data of an error detection code in accordance with a predetermined modulation rule is actually recorded in each address information field (PID) and each error detection code field (IED). The rewritable optical disk of this example uses an 8/16RLL(2, 10) modulation code as a modulation code to be recorded in each address information field (PID), error detection code field (IED), and data field 1010 in the data recording field 1003. In this case, 8/16 denotes that 8-bit binary data is converted to 16 channel bits. Moreover, RLL is the abbreviation for Run Length Limited and denotes that a run length, namely, the number of symbols O to be inserted between symbols 1 is finite when expressing a channel code by NRZ (Non Return to Zero). In the case of RLL (2, 10), a run length is limited so as to have a value ranging from 2 to 10. The rewritable optical disk of this example records data in the form of NRZI (Non Return to Zero Inverted), and therefore, in other words, in the case of RLL (2, 10), it can be said that lengths of a mark and a space are limited in a range from the minimum length 3T (two zeros) to the maximum length 11T (10 zeros). In the case of this example, 3T is referred to as a shortest mark $T_{min}$ and 11T is referred to as a longest mark $T_{max}$.

Among the fields constituting the data recording field 1003, the gap field 1006 is an field formed as a time margin for post-processing for reproducing address information from the header field 1002 of the apparatus and pre-processing for recording data in the subsequent fields below the front guard field 1007, but data to be reproduced is not recorded herein. The front guard field 1007 and rear guard field 1012 fieldreas for absorbing deterioration of a recording film that occurs when repeatedly recording data in the same sector, in which a specific repetitive pattern is recorded. The data VFO field 1008 is for recording a single pit pattern for quickly performing the lead-in operation of a reproductive-system PLL when reproducing data. In the case of this example, a continuous pattern of 4T-mark·4T-space same as the case of each VFO field of the header field 1002 is recorded in the front guard field 1007, data VFO field 1008, and rear guard field 1012.

The pre-sync code field 1009 records a pre-sync which is a specific pattern provided to detect the head of the succeeding data field 1010 and easily make bits synchronization. The data field 1010 is an field for actually recording user data, which is constituted of a plurality of sync frames in order to secure reliability of bite synchronization though not illustrated, and a sync code serving as a specific pattern is added to the head of each sync frame to facilitate the bite synchronization in each sync frame. Moreover, an error detection code according to a predetermined code rule is added to the user data recorded in the data field 1010 and the user data is recorded after the user data is modulated by using an 8/16RLL(2, 10) modulation code same as that used for each address information field (PID) and each error detection code field (IED) of the header field 1002. The data postamble field 1011 records a specific pattern showing the end of the data field 1010. The buffer field 1013 is an field for a time margin provided so as not to overwrite a header field immediately after even if a linear velocity is changed due to a factor such as rotational fluctuation or eccentricity of a disk when recording data, but data is not recorded in the field 1013.

Then, a method is described below which is used for a conventional optical disk drive when recording/reproducing data in or from a rewritable optical disk having a sector structure of a data format as described above.

In the case of a conventional optical disk drive, when recording/reproducing data in or from a predetermined sector 1001, the position of the predetermined sector 1001 on a disk is first specified by identifying address information from the header field 1002 to generate a timing for actual recording or reproducing in the data recording field 1003 after the above error detecting circuit detects that a pattern of the address information to which an error detection code is added, that is, (address information+error detection code) does not includes an error.

Moreover, in the case of the conventional optical disk drive, to record data in the predetermined sector 1001, it is a condition for recording data in the sector 1001 that there is no error in address-information-error-detection coded data in at least an address field, that is, at least a pattern of (address information+error detection code). That is, when there is an error in the pattern of (address information+error detection code) in every address field of a sector in which data will be recorded, the sector is judged as a defective sector and data is not recorded in the sector but the processing for substitution-recording data in another sector instead of the defective sector is performed.

Moreover, in the case where there is an error in the pattern of (address information+error detection code) in every address field of the predetermined sector 1001 when reproducing data from the sector 1001, it is impossible to correct a sector sync counter in the sector and therefore, by using an output of a sector sync counter corrected by a sector having at least one address field in which an error is not detected in the pattern of (address information+error detection code) immediately before the sector 1001, the timing necessary for reproducing the data of the sector is interpolated and reproduced.

As described above, the conventional optical disk drive cannot execute recording when there is an error in every address field of a sector to which data will be recorded. Therefore, the substitution processing of recording the data to be recorded to another sector must be executed, and a problem occurs that a lot of processing time is necessary and the recording throughput lowers. Particularly, when the data continuously input such as AV data is recorded to an optical disk, a fatal problem may occur that data is lost or recording must be interrupted because the data-recording speed cannot be ready because of the substitution processing due to an error in an address field.

Moreover, the conventional optical disk drive corrects a sector sync counter at the timing at which it is detected that there is no error in at least one address field of each sector and generates the timing required to record or reproduce data, and therefore it is necessary to generate a timing by interpolating the timing obtained from a sector in which there is no error in an address field immediately before in the case where there is an error in every address field of a sector from which data will be reproduced. Therefore, a problem lies in the accuracy of the data-reproducing timing. Particularly, when sectors having an error in every address field continuously occurs, a shift occurs in a timing signal necessary for detecting the first of data such as the above pre-sync detection window signal and there is a danger that a pattern may not be detected or may be erroneously detected. Moreover, in the worst case, a fatal problem may occur that a plurality of frames at the head of a sector are lost and thereby, a data error cannot be corrected and data cannot be reproduced.

Moreover, in the case of an information recording system for recording information in an optical disk having the data format shown in FIG. 18 by combining the optical disk drive with a host computer, field1-time characteristic, that is, a predetermined transfer rate is generally requested for the operation for recording AV data in the optical disk. However, the real-time characteristic is not always requested for the operation for recording computer data to be handled by a conventional personal computer in an optical disk but occurrence of an error is not permitted because even a small data error in computer data may give a fatal influence to a system.

In the case of the information recording system for recording the information including AV data having the real-time characteristic and the computer data which cannot permit an error in an optical disk, it is assumed that data errors include two types such as a data error and an address-information error.

For the data error, the idea of assuring the quality of recorded data by verifying the data is applied in the case of a conventional apparatus, however, in performing verification, a problem occurs that the normal-recording-sequence execution time increases.

For the address-information error, data is not recorded to a sector in which errors equal to or more than a predetermined number of errors are detected in address information in the conventional apparatus. Moreover, the data is generally recorded to the sector through retrying process. However, the recording-sequence execution time is increased due to retrying of recording to the same sector or alternation recording processing, a problem occurs that a data transfer rate for recording is deteriorated.

DISCLOSURE OF THE INVENTION

The present invention is made to solve the above problems and its object is to provide an optical-disk recording and/or reproducing apparatus for recording and/or reproducing data at a high reliability by minimizing deterioration of the recording throughput even if an error rate in an address field of a sector is lowered, and also to provide an information recording system and an information recording method employing the above apparatus and method.

To achieve the above object, an optical-disk recording and/or reproducing apparatus of the present invention is an optical-disk recording apparatus for recording data in a data recording field of an optical disk having a sector structure constituted of a header field previously storing address information and a data recording field for storing data, in which the header field includes an address mark field storing an address mark showing a beginning of address information, an address information field storing address information, and an error detection code field storing an error detection code for detecting an error in the address information field, said apparatus comprising:

means for detecting an address mark stored in the address mark field of the sector; and means for deciding and controlling a period of recording and/or reproducing data in and/or from the data recording field of the sector, wherein said data-recording and/or reproducing decision and control means uses an address-mark detection timing of the address-mark detection means in the decision and control of the data recording and/or reproducing period.

In the above optical-disk recording and/or reproducing apparatus, the data recording and/or reproducing decision and control means includes: address-information error detection means for detecting presence or absence of an error in the address-information based on the address information and the error detection code; and timing generation means for generating a recording and/or reproducing timing signal for deciding a data recording and/or reproducing operation by using the timing of detecting the address mark by the address-mark detection means and the timing of detecting by the address-information error detection means that there is no error in the address information.

In the above configuration, the data recording and/or reproducing decision control means permits recording and/or reproducing of data only in the following two cases when recording and or reproducing data in and/or from the data recording field of a predetermined sector:

(case 1) where address information having no error is obtained as a result of error detection in the subject sector executed by the address-information error detection means, and (case 2) where at least one piece of address information having no error is obtained in a predetermined number of sectors preceding the subject sector as a result of error detection by the address-information-error detection means and at least one address mark is detected in the address mark field of the subject sector.

Moreover, an optical-disk recording and/or reproducing method of the present invention is an optical-disk recording and/or reproducing method for recording data in a data recording field of an optical disk having a sector structure constituted of a header field previously storing address information and a data recording field for storing data, in which the header field includes an address mark field storing an address mark showing a beginning of address information, an address information field storing address information, and an error detection code field storing an error detection code for detecting an error in the address information field, the method comprising the steps of:

detecting an address mark stored in the address mark field of the sector; and deciding and controlling a period of recording and/or reproducing data in and/or from the data recording field of the sector, wherein the address-mark detection timing is used in the decision and control of the data recording and/or reproducing period.

In the above optical-disk recording and/or reproducing method, the data-recording decision and control step includes: an address-information error detecting step of detecting presence or absence of an error in the address-information based on the address information and the error detection code; and a timing generation step of generating a recording and/or reproducing timing signal for deciding a data recording and/or reproducing operation by using the address mark detection timing and the timing of detecting that there is no error in the address information.

Moreover, an information recording system of the present invention is an information recording system for recording information including transfer-rate-priority data and transfer-rate-nonpriority data in mixture supplied from an external unit to an optical disk having a sector structure constituted of a header field previously storing address information and a data recording field for storing data, said system comprising:

an optical disk drive for recording data to the data recording field in a predetermined sector of the optical disk; and determination means for determining whether the information to be recorded to the optical disk is transfer-rate-priority data or transfer-rate-nonpriority data, wherein when the information is the transfer-rate-priority data, the optical disk drive records the information in the sector to record the data even if there are errors equal to or more than a predetermined criterion in address information in the sector to record the data, and when the data is the transfer-rate-nonpriority data, the optical disk drive performs a recording retry process if there are errors equal to or more than the predetermined criterion in the subject sector.

In the above information recording system, the data determination means determines whether the information is transfer-rate-priority data or transfer-rate-nonpriority data by interpreting whether a command is a command for handling the transfer-rate-priority data or a command for handling the transfer-rate-nonpriority data issued from an external unit to the optical disk drive.

Moreover, an information recording method of the present invention is an information recording method for recording data supplied from an external unit to a data recording field of an optical disk having a sector structure constituted of a header field previously storing address information and a data recording field for storing data, the method comprising:

a step of determining whether the information to be recorded to the optical disk is transfer-rate-priority data or not, and a control step of recording the data in the sector to record the data even if there are errors equal to or more than a predetermined criterion in address information in the sector to record the data in the case of the transfer-rate-priority data, and recording the data in a substitute sector without recording the data in the subject sector to record the data if there are errors equal to or more than the predetermined criterion in the subject sector in case of the transfer-rate-nonpriority data.

The above information recording method further comprises a step of detecting an address mark recorded in an address mark field of the subject sector, and a step of deciding and controlling a period of recording data to the data recording field of the subject sector, wherein the address-mark detection timing is used for decision and control of the data recording period.

The data-recording decision and control step includes: an address-information error detecting step of detecting presence or absence of an error in the address-information based on the address information and the error detection code; and a timing generation step of generating a recording timing signal for deciding a data recording operation by using the address mark detection timing and the timing detected in the address-information error detecting step of detecting that there is no error in the address information.

According to the configuration of an optical-disk recording apparatus or an optical-disk reproducing apparatus of the present invention, it is possible to decide data-recording start timing or data-reproducing start timing in accordance with the address mark detection timing, and therefore, it is possible to accurately record or reproduce data in or from a sector even including errors in address information, and thereby improve the reliability of the apparatus.

Moreover, according to the configuration of an optical-disk recording apparatus or an optical-disk reproducing apparatus of the present invention, it is possible to determine whether data recording or data reproducing is performed to or from a predetermined sector under the condition that, when address information having no error is obtained in the subject sector, or when address information having no error is obtained in at least a certain sector in a predetermined sectors preceding the subject sector together with an address mark being detected in the subject sector. Therefore, by correcting a sector sync timing in the sector concerned, it is possible to improve the reliability of the apparatus because data is recorded or reproduced in or from only a sector in which an accurate timing can be generated.

Furthermore, according to an optical-disk recording method of the present invention, it is determined whether the data is transfer-rate preference data or error-permissive data and data recording of only the transfer-rate-preference data is executed, and therefore it is possible to minutely correspond to an apparatus performance requested for each data.

Thus, by applying an optical-disk recording method of the present invention to an information recording system for handling multimedia including computer data and real-time AV data in mixture, it is possible to provide a high-speed and high-reliability system.

BEST MODE FOR CARRYING OUT THE INVENTION

Figure 1:
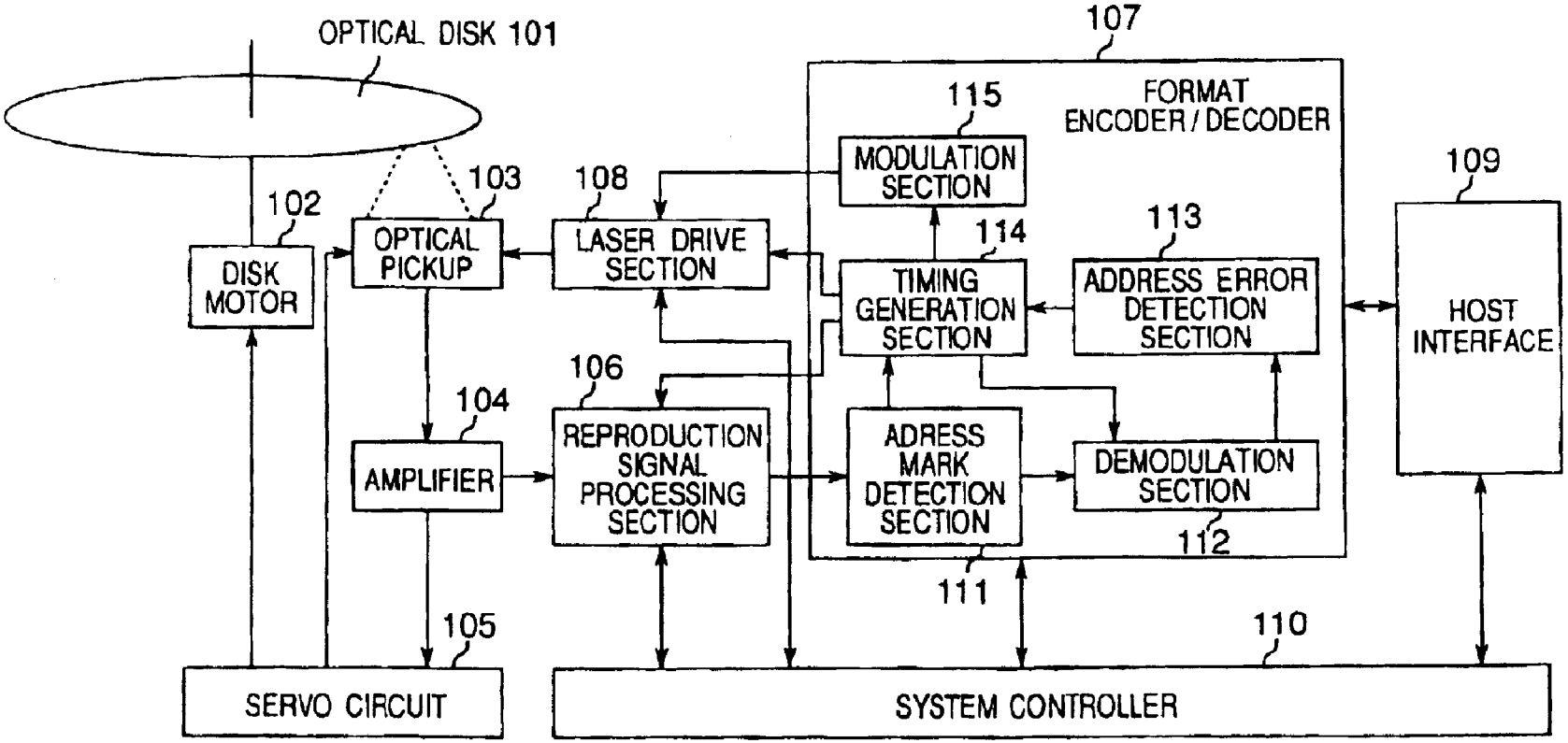
FIG. 1 is a block diagram showing a configuration of an optical disk drive according to the present invention.

Embodiments of the present invention are described below by referring to the drawings.

FIG. 1 is a block diagram showing a configuration of an optical disk drive (also referred to as disk drive) according to the present invention. In FIG. 1, a disk motor 102 rotates an optical disk 101 at a predetermined revolution number. An optical pickup 103 includes a semiconductor laser, optical system, and photodetector to record and reproduce data when a laser beam emitted from the semiconductor laser is condensed by the optical system to apply a light spot to the recording face of the optical disk 101. Moreover, the light reflected from the recording face is condensed by the optical system, converted to a current by the photodetector, and moreover voltage-converted and amplified by an amplifier 104, and outputted as a reproduced signal.

A servo circuit 105 performs a rotation control of the disk motor 102, transfer control for moving the optical pickup 103 in a radius direction of the optical disk 101, focus control for focusing a light spot on a disk recording face, and tracking control for tracking a light spot to the center of a target track. For the focus control and tracking control, a focus error signal and a tracking error signal are used among reproduction signals serving as outputs of the amplifier 104.

The focus error signal is an electrical signal showing a defocus of a light spot from the recording face of the optical disk 101 and the tracking error signal is an electrical signal showing a shift of a light spot from a predetermined track of the optical disk 101.

A reproduction-signal processing section 106 fetches a signal component corresponding to the data recorded in the optical disk 101 from a reproduction signal, binarizes the fetched signal to binary data, generates a read clock in accordance with the binary data and a reference clock, by a built-in PLL (Phase Locked Loop) (not illustrated), and reproduces read data synchronizing with the read clock.

A laser driving section 108 generates a laser-driving signal so that a semiconductor laser built in the optical pickup 103 emits light by a reproduction power when reproducing an address and user data, and by a recording power when recording data.

A format encoder/decoder 107 reproduces the address information that is recorded in the optical disk 101 in accordance with the read clock and read data output from the reproduction signal processing section 106, and generates and supplies various timing signals necessary for recording or reproducing at the timing synchronized with a sector of the optical disk 101 on the basis of the position of the reproduced address information. It is possible to record or reproduce data at a correct timing by outputting a timing signal such as read gate signal which is necessary for binarization of an address or data or PLL processing to the reproduction signal processing section 106 at the time of reproduction, or by outputting a timing signal such as a write gate signal for allowing light emission of a recording power to the laser driving section 108 at the time of recording.

Portions relating to the present invention among main functional blocks built in the format encoder/decoder 107 are briefly described below.

An address-mark detection section 111 detects an address mark (AM) which is recorded in an address field by using the read clock and read data supplied from the reproduction signal processing section 106. A demodulation section 112 demodulates address information and user data by using the read clock and read data supplied from the reproduction signal processing section 106. An address-error detection section 113 detects errors in the address information (address demodulation data) demodulated by the demodulation section 112. A timing generation section 114 secures the synch with a sector format by using an address-mark detection timing signal by the address-mark detection section 111 and a timing signal detecting that there is no error in address information by the address-error detection section 113, and generates a timing signal necessary for recording or reproducing data. Details of operations of the sections above described will be described later.

Moreover, when recording data, the format encoder/decoder 107 adds a redundant data parity such as an error correction code to user data supplied from an external unit through a host interface 109, and outputs write data modulated by a built-in modulation section 115 in accordance with a predetermined format to the laser driving section 108. Moreover, when reproducing data, the format encoder/decoder 107 performs demodulation and error correction of the data recorded in the optical disk 101 in accordance with the read clock and read data output from the reproduction signal processing section 106, and transmits the corrected data to an external unit through the host interface 109.

A system controller 110 interprets a command supplied from an external unit through the host interface 109 to control operations of the servo circuit 105, reproduction signal processing section 106, format encoder/decoder 107, laser driving section 108, and host interface 109 so that data is recorded or reproduced in or from a predetermined sector of the optical disk 101.

Hereafter, configurations and operations of the timing generation section 114 and its periphery to be a specific feature of the present invention are described by using a plurality of examples.

Figure 2:
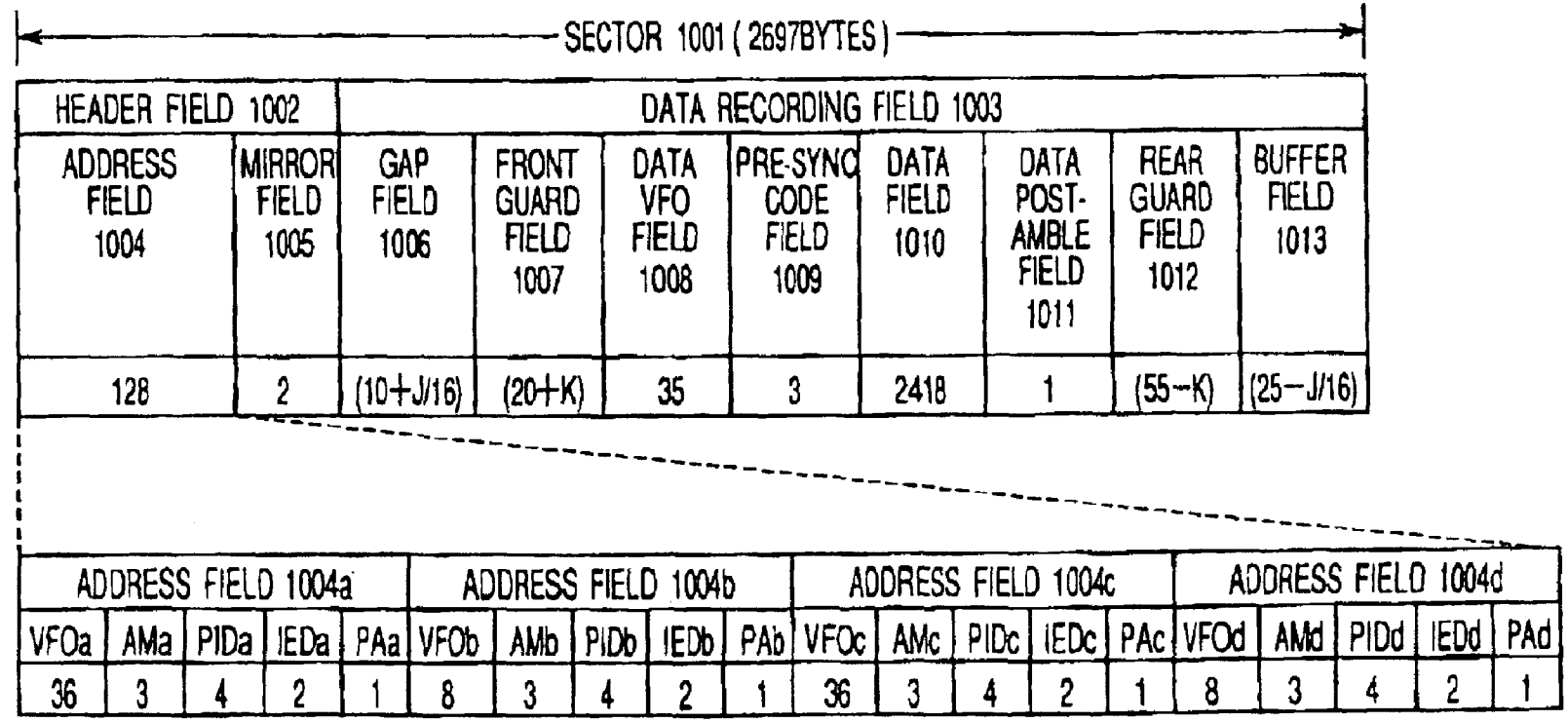
FIG. 2 is an illustration showing a configuration of a data format in a sector of an optical disk according to the present invention.
Figure 18:
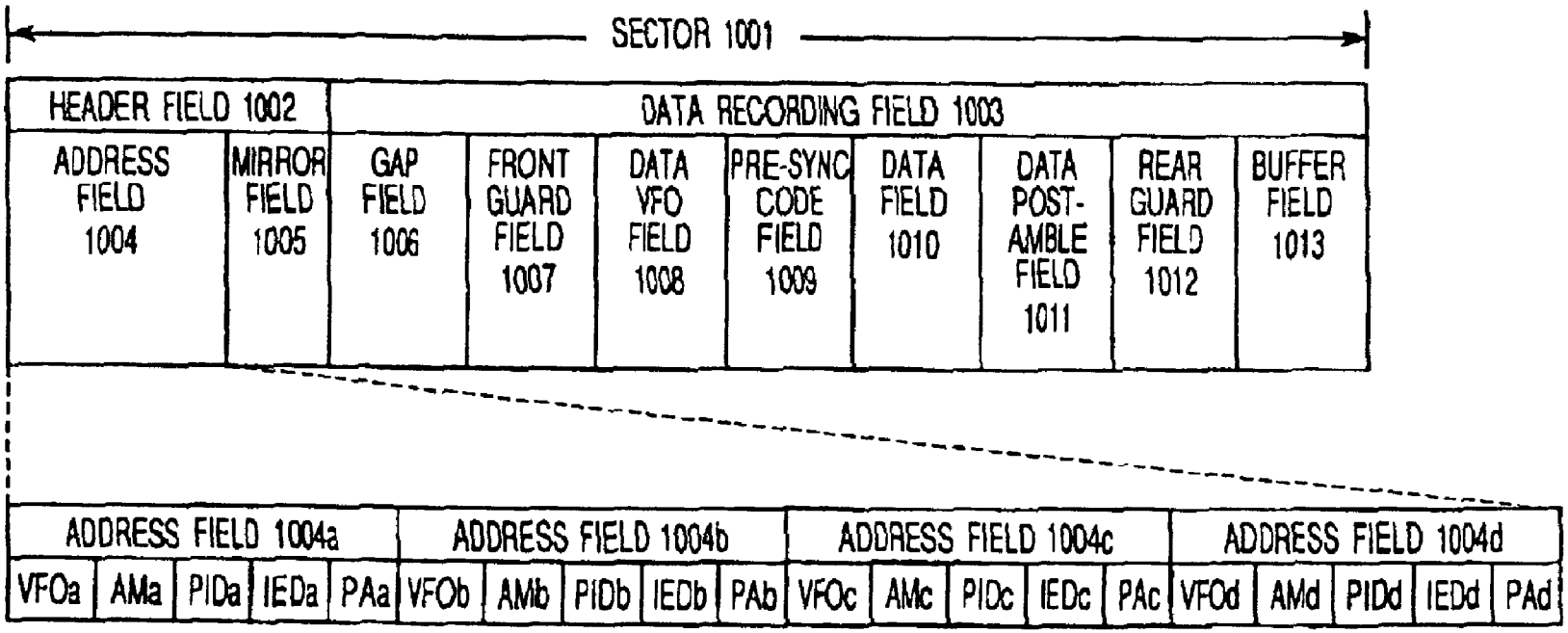
FIG. 18 is an illustration showing a configuration example of a data format in a sector of a conventional optical disk.

In this case, it is assumed that the optical disk 101 in or from which data will be recorded or reproduced has the data format shown in FIG. 2 as an example of a sector format. Moreover, a case is described as an example in which a predetermined number of bites shown in FIG. 2 is assigned to each field of the data format shown in FIG. 18 described for the prior art. Furthermore, one byte denotes a length of 8 bits in the case of binary data, namely, a length of 16 channel bits in the case of a modulated pattern. In the case of this example, the length of one sector is equal to 2,697 bytes in which the length of the header field 1002 uses 130 bytes.

A parameter J used to show lengths of the gap field 1006 and buffer field 1013 is an integer ranging from 0 to 15 and the total number of bytes of the gap field and buffer field becomes 35 (constant value). Moreover, a parameter K used to show lengths of the front guard field 1007 and rear guard field 1012 is an integer ranging from 0 to 7. These parameters J and K are selected at random at the apparatus side. Thereby, recording start and end positions and the recording position of a specific pattern of such as a sync code are not fixed in a predetermined sector and thus, it is possible to reduce the deterioration of a recording film that occurs when data is repeatedly recorded.

In this case, a specific pattern {000100010 00000000000010001000100000000000010001} having a length of 3 bytes (that is, 48 channel bits) is recorded in each address mark field (AM) of each address field section. This is an NRZI notation comprising {4T-mark·4T-space·14T-mark·4T-space·4T-mark·14T-space·4T-mark}. Because one 14T-mark and one 14T-space each having a length of ($T_{max}$+3T) are respectively included, a code distance is long and thereby, the probability of erroneously detecting the pattern of the address information field PID, error detection code field IED, and data field 1010 for which 8/16RLL(2, 10) is used as a modulation code, for the above address mark, is low. Moreover, because the DSV of an address mark has a small value of 4, it is possible to stably keep a slice level when a reproduction system of an apparatus binarizes an address mark and subsequent address information field and error detection field. In this case, DSV is the abbreviation of Digital Sum Value, which is obtained by assuming encoding data 1 as +1 and encoding data 0 as −1 and thereby calculating the total sum in a certain pattern and used as a scale for measuring an influence on a reproduction system for binarization or the like in order to show the DC component of a code word.

First, the basic operation is described below of generating a timing signal for actually recording or reproducing in the data recording field 1003 in accordance with the timing of detecting that there is no error in the pattern of address information (address information+error detection code) by the address-error detection section 113. The above operation is performed, similarly to the prior art, by using a counter for counting a clock having a one-channel-bit cycle or a cycle of integral multiples of the one-channel-bit cycle.

More specifically, the above counter is a sector sync counter for counting a one-sector length of 2,697 bytes and a count value is corrected to a predetermined counted value at the timing at which an error detection circuit detects that there is no error. Because the data format shown in FIG. 2 has a plurality of address fields, the count value is corrected to a respective counted value when the address field number in order in a sector can be identified in accordance with the additional information included in the address information. By correcting a counted value including the time required to identify an address field in the number of bytes of end positions of the first to fourth address fields 1004a, 1004b, 1004c, and 1004d from the head of a sector, the counted value serving as an output of the sector sync counter can almost accurately express a byte position from the head of the sector. Therefore, by using the output of the sector sync counter, it is possible to generate the recording/reproduction start timings of a sector to be recorded/reproduced.

For example, it is assumed to generate a recording-gate signal which becomes H-level in the period from the front guard field 1007 up to the rear guard field 1012 of a sector to be recorded, for use in the recording-operation control of the recording system of an apparatus. In the case of the data format of this example, the start position of the front guard field 1007 is (140+J/16) bytes behind the head of the sector and the end position of the rear guard field 1012 is (2672+J/16). Therefore, when assuming that a clock having a cycle of one channel bit is used, it is possible to generate the above recording-gate signal by using a logic circuit in which the recording-gate signal is set to H level when a counted value of the sector sync counter indicates (140+J/16) in terms of the number of bytes, that is, 16 times (2,240+J) of the (140+J/16) in terms of the number of channel bits and the signal is set to L level when the counted value of the sector sync counter indicates (2,672+J/16) in terms of the number of bytes, that is, 16 times (4,2752+J) of the (2,672+J/16) in terms of the number of channel bits. Practically, because the recording-gate signal is early set to H level in consideration of such as a circuit delay of the recording system, an offset value may be provided to the above counted value.

As another example, it is assumed to generate a pre-sync detection window signal which is to be set to H level in at least the pre-sync-code field 1009 of a sector having data to be reproduced and which is used for pre-sync detection of an apparatus. In the case of the data format of this example, the end position of the pre-sync-code field 1009 is (198+K+J/16) bytes behind the head of the sector. Therefore, to detect a pre-sync through the complete coincidence detection of three-byte pattern so that the pre-sync can be detected while a pre-sync-detection-window signal is kept H-level even if J and K respectively take any value, it is necessary to generate a pre-sync-detection-window signal to be kept H-level in the period from at least 198 bytes later from the head of the sector up to (205+15/16) bytes later for which the maximum value 7 of K and the maximum value 15 of J are substituted. Practically, the time position of a pre-sync detection window may be shifted by considering a processing delay such as a circuit delay of a reproduction system or an H-level period may be set widely to a certain extent by considering a fluctuation factor such as a linear velocity. Because not only detection of a pre-sync is used but also it is used together with detection of the sync code of the first frame of the data field 1010, the end position of H level may be set to be delayed by a predetermined number of bytes. Moreover, when a pre-sync is detected not through complete coincidence detection of three-byte pattern but through detection of only partial coincidence, it is also permitted to set the H-level period of the pre-sync detection window to a width other than the above described.

(Embodiment 1)

Figure 3:
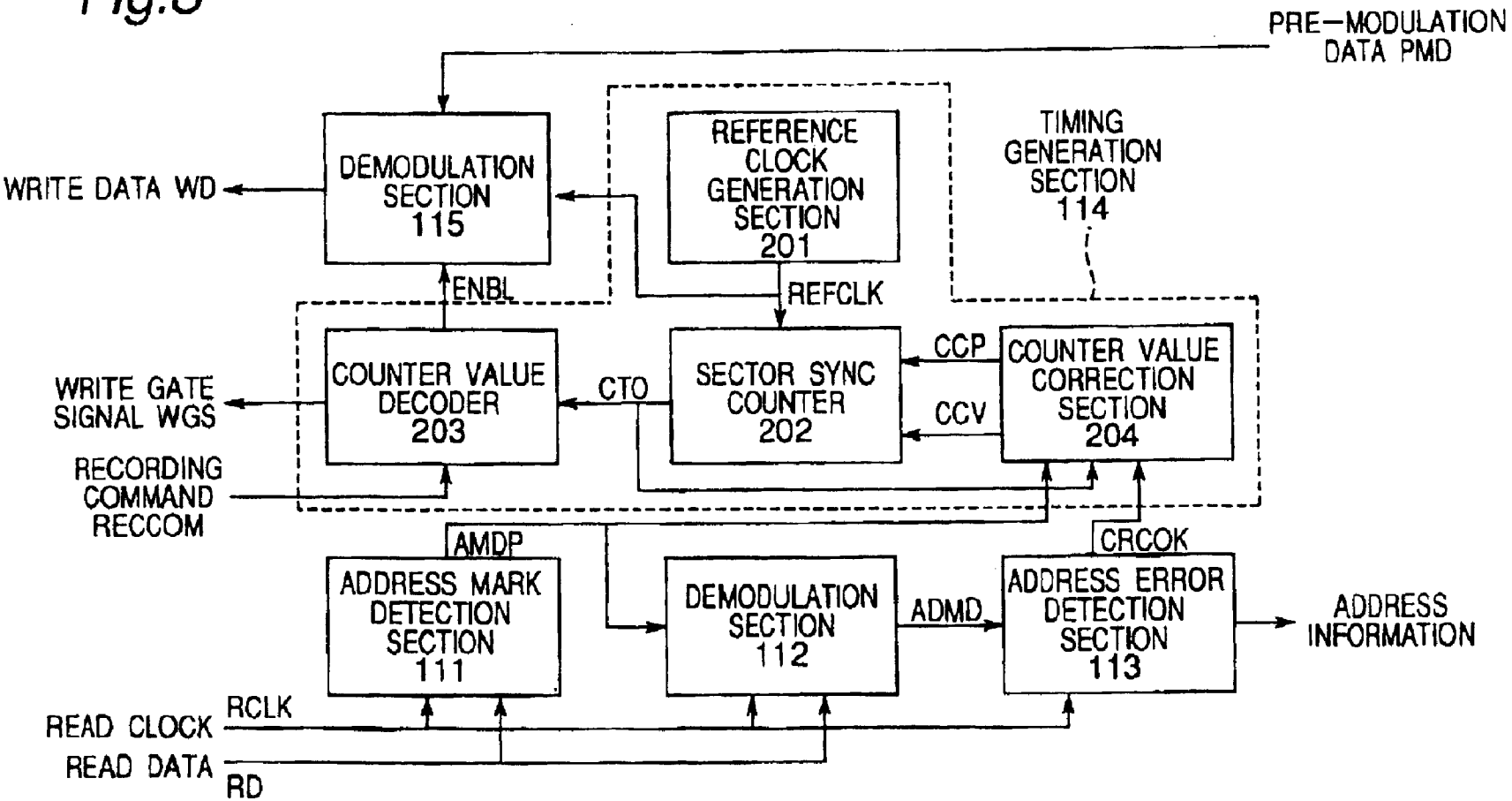
FIG. 3 is a block diagram showing a configuration example of an internal structure of timing generation means 114 and a periphery thereof in one embodiment of the present invention.

FIG. 3 is a block diagram showing a configuration of a timing generation section 114 and a configuration of the periphery thereof in an embodiment of the present invention and operations thereof are described below in detail by referring to FIG. 3.

First, an address-mark detection section 111 detects a pattern of an address mark recorded in each address mark field (AM) shown in FIG. 2 by using a read clock RCLK and read data RD supplied from the reproduction signal processing section 106 and outputs an AM detection pulse AMDP at the timing of detecting the address mark.

A demodulation section 112 demodulates address-information-error-detecting-and-encoding data corresponding to address information and an error detection code recorded in an address information field (PID) and an error detection code field (IED), respectively, that is, (address information+error detection code) by using the read clock RCLK and read data RD, and generates and outputs address demodulation data ADMD. When generating the address demodulation data ADMD corresponding to (address information+error detection code), the demodulation section 112 refers to the AM detection pulse AMDP as the timing for generating the demodulation data ADMD and starts demodulation by using read data RD corresponding to the following (address information+error detection code) in accordance with the timing of the AM detection pulse AMDP.

An address-error detection section 113 detects whether there is an error in the pattern of (address information+error detection code) by using the address demodulation data ADMD. When there is no error, the section 113 outputs a CRCOK pulse (CRCOK). According to the example of the data format in FIG. 2, (address information+error detection code) data is comprised of 6 bytes in total and it is assumed that an error detection code of 2 bytes out of 6 bytes is encoded by using a known Reed-Solomon code, it is possible to easily detect whether there is an error in the data of the total 6 bytes by performing the known syndrome calculation.

The timing generation section 114 in FIG. 3 has a function of generating a timing signal such as read gate signal WGS required to record data and is constituted of a reference-dock generation section 201, sector sync counter 202, counted-value decoder 203, and counted-value correction section 204. Each functional block is described below.

The reference-clock generation section 201 generates a reference dock REFCLK serving as a criterion for recording data. In this embodiment, it is assumed that one cycle of the reference clock is equal to one-channel-bit cycle of the data format shown in FIG. 17. To generate the reference clock REFCLK by the reference-clock generation section 201, a plurality of methods are considered in accordance with the track format of an optical disk 101. Moreover, because the reference clock is used to record data, the jitter component of the clock may influence the recording quality. Therefore, it is necessary to control the jitter component of the reference clock REFCLK so that the recording quality is not deteriorated.

First, in the case of recording data over the whole circumferential tracks at a fixed frequency as the known CAV (Constant Angular Velocity) system, it is permitted to generate clocks at a fixed frequency by using a quartz oscillator. Moreover, in the case of such as the known ZCAV (Zoned Constant Angular Velocity) system to classify into zones every predetermined radial range and change a recording frequency every zone, it is permitted to generate clocks at fixed frequencies different every zone by using such as a frequency synthesizer. Moreover, as a certain type of an optical disk, a pattern for obtaining a recording frequency may be previously recorded on a disk. For example, the wobble groove system in which a guide groove for forming a track is meandered at a predetermined cycle and a sample servo system in which clock-reproduction pits are formed every certain interval of tracks correspond to the above systems. In this case, the reference-clock generation means 201 requires means for reproducing a pattern formed on an optical disk and PLL means for generating clocks synchronizing with the reproduced pattern.

The sector sync counter 202 is a counter for counting the reference clocks REFCLK so that a counted value of the counter 202 shows a byte position in one sector. According to the data format shown in FIG. 2, one sector has a length of 2,697 bytes, that is, a length of 2,697×1.6=43,152 channel bits. Therefore, when assuming that a reference clock REFCLK is a clock having a cycle of 1 channel bit, it is possible to constitute the counter 202 of a 16-bit loop counter which counts from 0 to 43,151 and then returns to 0.

Moreover, it is necessary to synchronize the position of a light spot to be applied to the optical disk with a counted value of the sector sync counter 202. Therefore, employed is a technique that the counted value is corrected by using a counted-value correction pulse CCP and count correction value CCV output from the counted-value correction section 204. The function of the counted-value correction means will be described later. In this embodiment, a counted value of the sector sync counter 202 is output as a counter output CT0 by assuming that the counted value shows the number of channel bits from the head of each sector.

The counted-value decoder 203 generates various timing signals synchronizing with the data format of a sector by decoding the counter output CT0 output from the sector sync counter 202.

The example in FIG. 2 shows a case in which a data-recording command RECCOM input through the host interface 109 is received from the system controller 110, and the counted-value decoder 203 outputs a write gate signal WGS to the laser driving section 108 and outputs an enable signal ENBL necessary for demodulation to the demodulation section 115. Details of the timing-signal generation will be described later.

The counted-value correction section 204 receives an address-mark detection pulse AMDP output from the address-mark detection section 111 and a CRCOK pulse showing that there is no error output from the address-error detection section 113, and outputs a counted-value correction pulse CCP and a count correction value CCV to the sector sync counter 202.

Figures 4A, 4B, 4C, 4D, 4E:
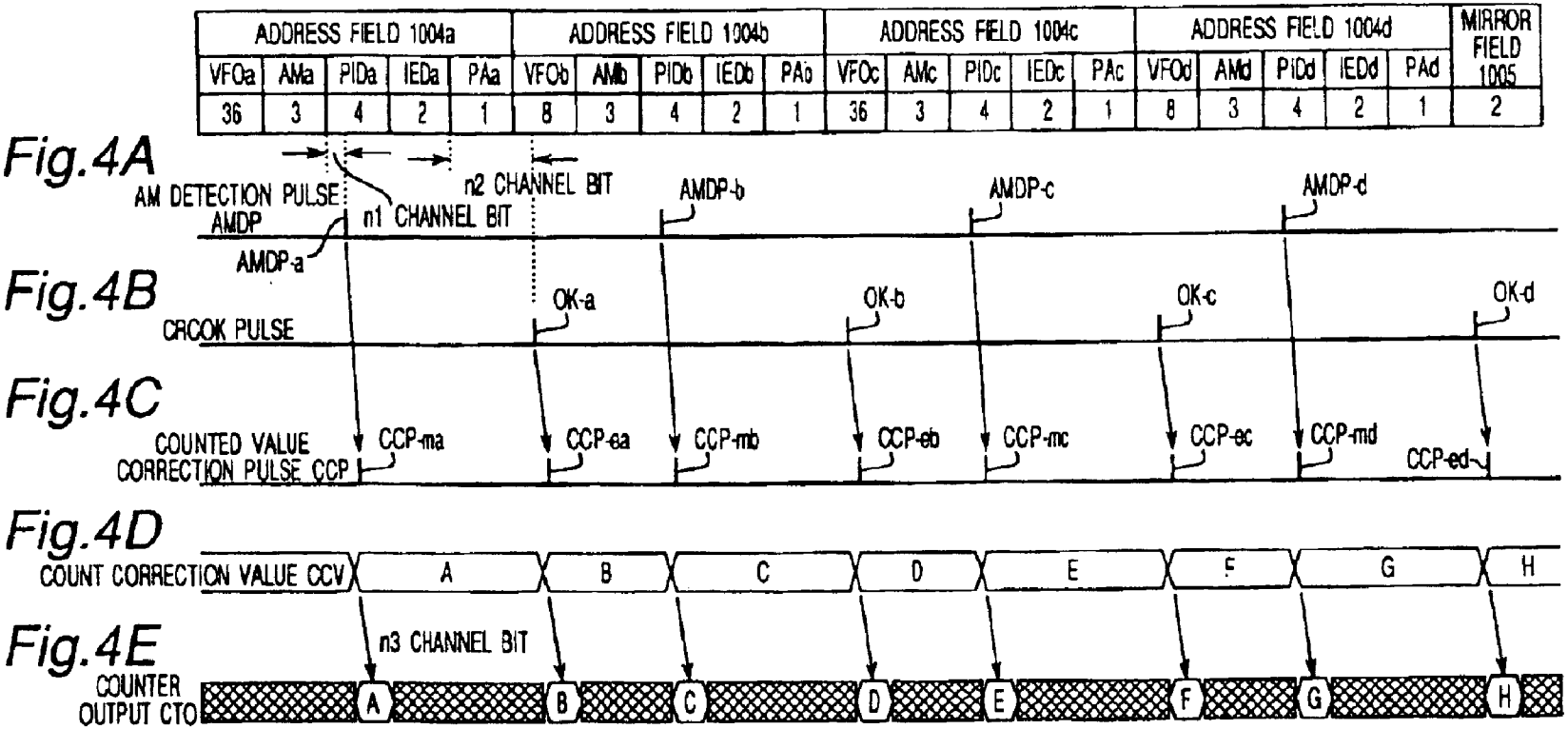
FIGS. 4(a), (b), (c), (d) and (e) are timing charts for explaining an example of a counted-value correcting operation of a sector sync counter 202 in one embodiment of the present invention.

FIGS. 4 show the timings for explaining the counted-value-correcting operation of the sector sync counter 202 in this embodiment. The top of FIG. 4 shows details of the data format of the header field 1002 in one sector, in other words, a position to which a light spot follows in a predetermined sector on an optical disk. Moreover, it is assumed that time advances from left to right.

In the case of the address-mark detection pulse AMDP output from the address-mark detection section 111, a pulsatile H level is output at the timing of detecting an address mark by reproducing each address mark field (AM). Therefore, the pulse AMDP is output to be delayed by the time equivalent to the number of delay channel bits of approx. n1 later than the following position of a light spot (each address-mark AM end position) as AMDP-a, AMDP-b, AMDP-c, and AMDP-d as shown in Figure. Herein, n1 denotes the number of delay channel bits from the time when a light spot irradiates an address-mark terminal position up to the time when an AM detection pulse AMDP is output.

Referring to the CRCOK pulse output from the address-error detection section 113, a pulsatile H-level CRCOK is output when there is no error as a result of demodulating reproduced data and detecting an error in address demodulation data by reproducing each address-information field (PID) and error detection field (IED). Therefore, as shown in Figure, the CRCOK pulse is output to be delayed by the time equivalent to approx. n2 channel bits from the following position (each IED-section terminal position) of a light spot as OK-a, OK-b, OK-c, and OK-d. Herein, n2 denotes the number of delay channel bits from the time when the light spot irradiates an error-detection-IED-section terminal position up to the time when the CRCOK pulse is output.

The counted-value correction pulse CCP is an H-level pulsatile signal generated by the counted-value correction section 204 by using the AM detection pulse AMDP and CRCOK pulse. In this case, as shown in Figure, CCP-ma, CCP-mb, CCP-mc, and CCP-md are generated correspondingly to AMDP-a, AMDP-b, AMDP-c, and AMDP-d; and CCP-ea, CCP-eb, CCP-ec, and CCP-ed are generated correspondingly to OK-a, OK-b, OK-c, and OK-d, respectively; which are used for timings for correcting the counted values in the sector sync counter 202.

Count correction values CCV take values previously decided every positions of the above AM detection pulse AMDP and CRCOK pulse. In this embodiment, the values are set to A, B; C, D; E, F; and G, H in the address mark field AMa and error detection code field IEDa of first address field 1004a, address mark field AMb and error detection code field IEDb of second address field 1004b, address mark field AMc and error detection code field IEDc of third address field 1004c, and address mark field AMd and error detection code field IEDd of fourth address field 1004d, respectively. Because the count correction value CCV is output to the sector sync counter 202 together with the counted-value correction pulse CCP, it must be decided at each H pulse portion of the counted-value correction pulse CCP.

To determine an address field in which the output AM detection pulse AMDP or CRCOK pulse is included, it is recommended to refer to, for example, a bit pattern capable of specifying an order number of an address field to which the pulse AMDP or CRCOK corresponds. In general, since a code capable of identifying an address field number to which the pulse AMDP or CRCOK corresponds is assigned to a certain specific bit of an address information field (PID), it is possible to easily identify by using the bit.

Moreover, to determine an address field in which an address mark is included, it is permitted to use an identifiable pattern. However, the same pattern is generally used for any address field. Therefore, it is not easy to identify an address mark included in which address field. However, it is also possible to identify the address mark by referring to, e.g., a counted value of the sector sync counter 202 when the address mark is detected. Moreover, a method is considered which identifies an address mark by setting a specified detection window to the address mark of each address field. This method will be described later in detail.

It is permitted to set the count correction values CCV for each counted-value correction pulse CCP, that is, values of A to H to the values as following, in order to completely synchronize a light-spot irradiation position with a value of a sector sync counter.

$$A=39\times16+n1+n3$$

$$B=45\times16+n2+n3$$

$$C=57\times16+n1+n3$$

$$D=63\times16+n2+n3$$

$$E=103\times16+n1+n3$$

$$F=109\times16+n2+n3$$

$$G=121\times16+n1+n3$$

$$H=127\times16+n2+n3$$

Herein, n3 denotes the number of delay channel bits from the time of outputting the AM detection pulse AMDP or CRCOK pulse up to the time of completing correction of values counted by the sector synch counter 202.

Thus, by using the AM detection pulse AMDP serving as the address-mark detection timing and the CRCOK pulse serving as the timing of detecting no error in address information, it is possible to correct a counted value of the sector sync counter 202. Thereby, it is possible for the counter output CT0 after the counted-value correcting operation to accurately express the light-spot irradiation position at this point of time, that is, the number of channel bits from the head of a sector. Therefore, it is possible to correct a positional shift of each sector by correcting a counted value in the header field 1002 of the next sector. Thus, even if a shift occurs between the counter output CT0 and a light-spot irradiation position when one sector is completed due to a fluctuation factor such as the fluctuation of a linear velocity or the fluctuation of a reference-clock frequency due to a shift of the number of revolutions or the eccentricity of a disk, it is possible to correct every sector positional shift by correcting a counted value based on the header field 1002 of the next sector to thereby accurately adjust the data-recording/reproducing timing and keep a high reliability of an apparatus.

As described in the above embodiment, it is a feature of the present invention to correct a count value of the sector sync counter 202 by using the AM detection pulse AMDP serving as the address mark detecting timing. Thus, as described below, the present invention can effectively function even if an error is detected in every pattern of (address information+error detection code) in a certain sector.

Figures 5A, 5B, 5C, 5D, 5E:
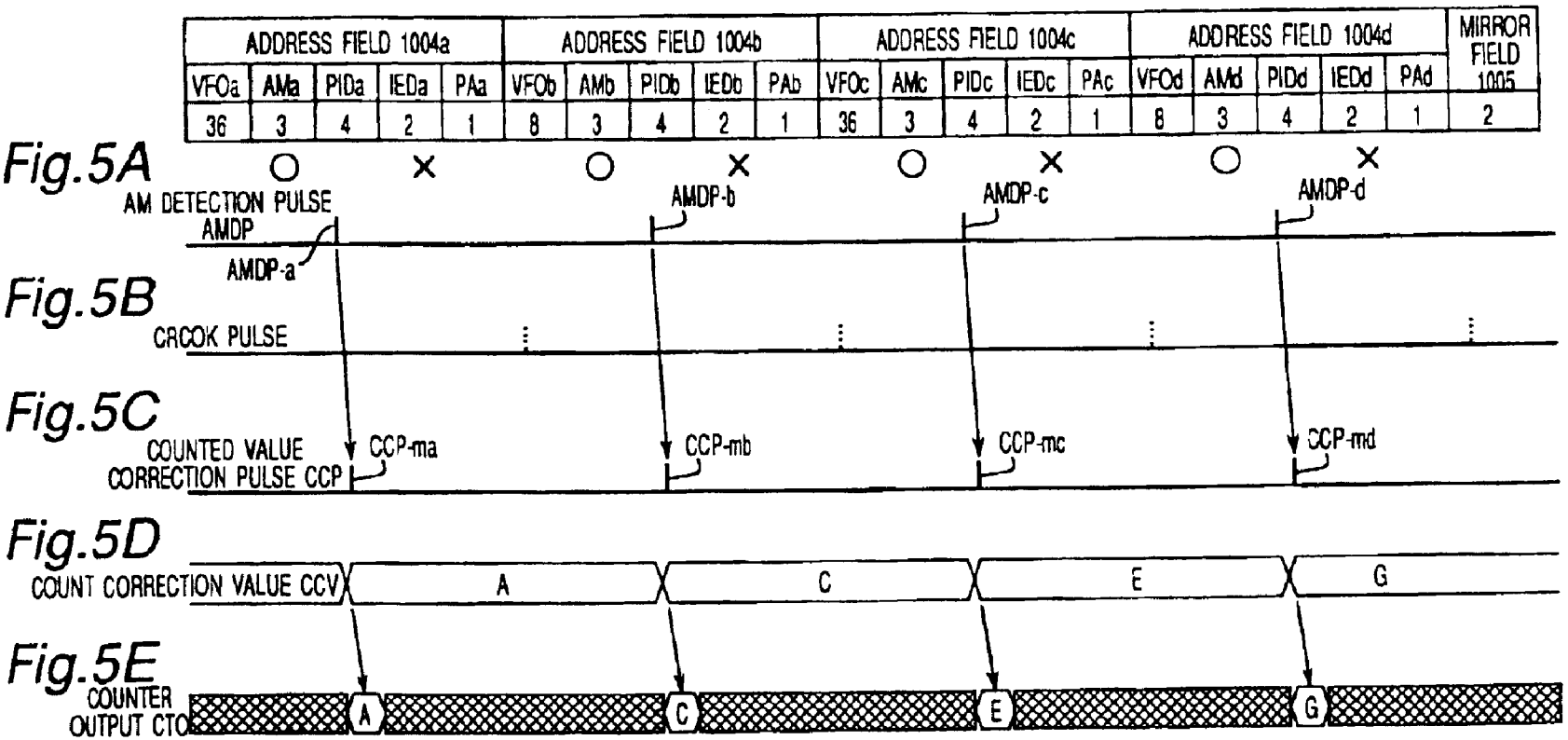
FIGS. 5(a), (b), (c), (d) and (e) are timing charts for explaining another example of a counted-value correcting operation of the sector sync counter 202 in one embodiment of the present invention.

FIGS. 5 are timing charts for explaining a second example of the counted-value-correcting operation of the sector sync counter 202 in this embodiment. The example in FIG. 5 is different from the example in FIG. 4 in that an error is detected in every (address information+error detection code).

In FIGS. 5, symbols ○ and X drown immediately below the uppermost data format of the header field 1002 show that address marks field11 detected in the address mark fields AMa, AMb, AMc, and AMd and errors are detected in all of the error detection code fields IEDa, IEDb, IEDc, and IEDd. Therefore, the AM detection pulse AMDP is output after n1-channel bits period of a predetermined time from each address-mark section terminal similarly to the example in FIG. 4. Moreover, no H pulse of the CRCOK pulse is output in the illustrated sector but the CRCOK pulse is kept L-level (shown by a dotted line) differently from the example of FIG. 4.

Therefore, the counted-value correction pulse CCP is output as an H pulse only when the pulse CCP corresponds to the time when the AM detection pulse AMDP is output. The count correction value CCV has a predetermined value every position of the output AM detection pulse AMDP. That is, the value CCV becomes A, C, E, and G in the address mark fields AMa, AMb, AMc, and AMd, respectively.

A conventional method cannot correct the timing in a sector having an error in every address information. Therefore, if a shift occurs between the counter output CT0 and a light-spot irradiation position when one sector is completed due to a fluctuation factor such as the fluctuation of a linear velocity of the fluctuation of a reference-clock frequency due to a shift of the number of revolutions or eccentricity of a disk, the influence of the shift may reach up to the next sector. Moreover, if sectors having an error in every piece of address information continuously occurs, the data-recording/reproducing timing is greatly shifted because shifts fieldccumulated. In the worst case, a trouble may occur that data is recorded up to a position in which data must not originally be recorded or recorded data cannot correctly be reproduced. However, this embodiment exhibits the following advantage for the above conventional problem.

That is, according to the configuration shown in this embodiment, when only an address mark is detected even in a sector having an error in every piece of address information, it is possible to correct a counted value of the sector sync counter 202 by using the AM detection pulse AMDP. Therefore, it is possible to correct a shift in position for each sector independently of an error existence or absence in the address information, and accurately adjust the datarecording/reproducing timing, and keep the high reliability of an apparatus.

Figures 6A, 6B, 6C, 6D, 6E:
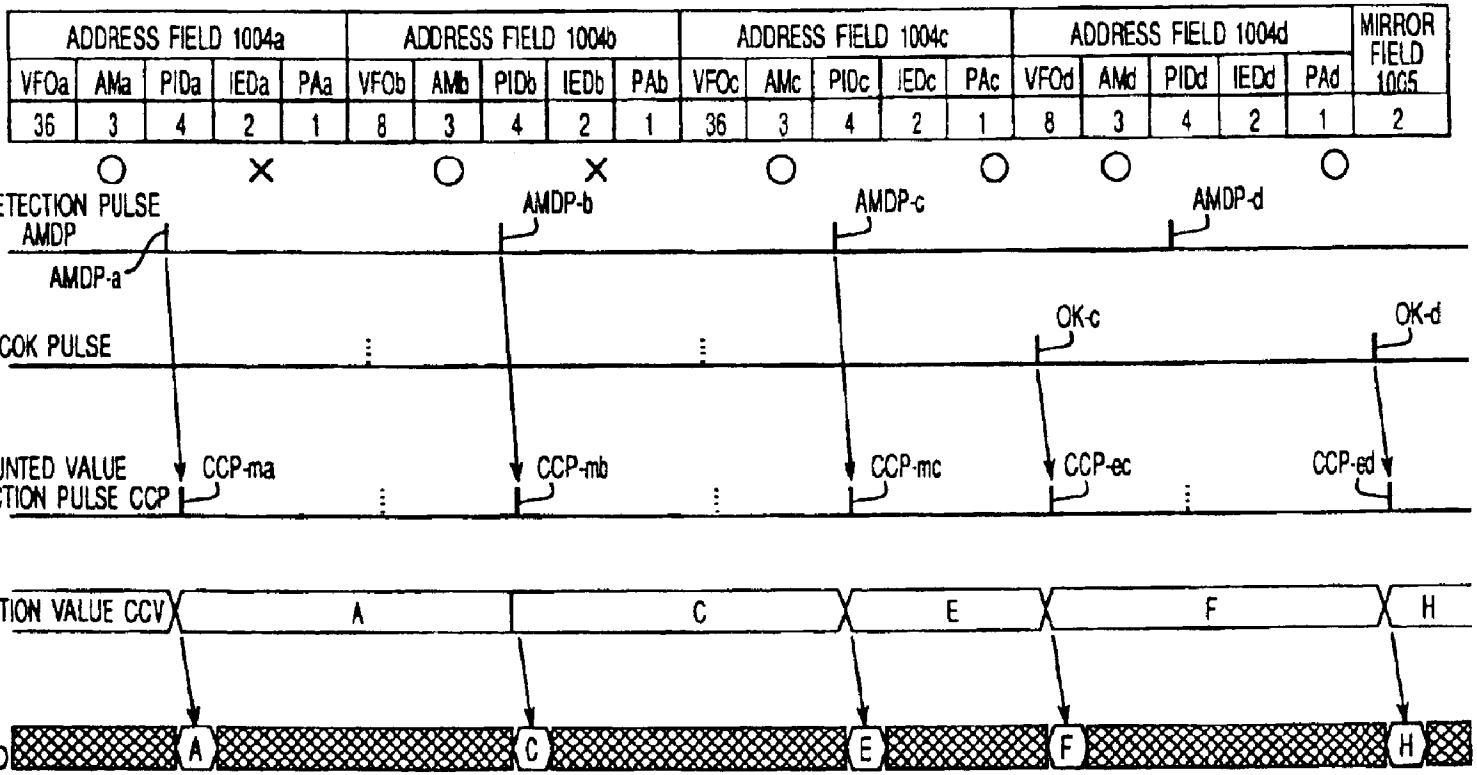
FIGS. 6(a), (b), (c), (d) and (e) are timing charts for explaining an example of a counted-value correcting operation of the sector sync counter 202 in one embodiment of the present invention.

FIGS. 6 are illustrations for explaining a third example of the counted-value-correcting operation of the sector sync counter 202 in this embodiment. The operation example in FIG. 6 is characterized in that counted-value correction according to the address-mark-detection timing is not performed after counted-value correction following a CRCOK pulse is once performed as described below.

In FIG. 6, symbols ○ and X drawn immediately below the uppermost details of the data format of the header field 1002 show that address marks are detected (○) in all of the address mark fields AMa, AMb, AMc, and AMd and errors (X) are detected in error detection code fields IEDa and IEDb but an error is not detected (○) in error detection code fields IEDc or IEDd. Therefore, the AM detection pulse AMDP is output as an H pulse at four places (shown by AMDP-a, AMDP-b, AMDP-c, AMDP-d) similarly to the example in FIG. 5. Moreover, the CRCOK pulse is output as an H pulse at only two latter-half places (shown by OK-c, OK-d) in the illustrated sector differently from the example in FIG. 5.

The counted-value correction pulse CCP is output as an H pulse at the total of five places such as timings (shown by CCP-ma, CCP-mb, and CCP-mc) of the AM detection pulses AMDP at three places corresponding to the address mark fields AMa, AMb, and AMc and timings (shown by CCP-ec and CCP-ed) of the CRCOK pulses at two places corresponding to the error detection code fields IEDc and IEDd. The count correction value CCV takes a predetermined value shown in FIG. 4 for each position, that is, A, C, E, F, and H in the order from the front.

As shown in this example, if the CRCOK pulse is once output in each sector (in this example, an OK-c pulse corresponding to IEDc is generated), the counted-value correction pulse CCP is not output at the timing corresponding to the AM detection pulse AMDP. In this example, the counted-value correction pulse (illustrated by a dotted line) corresponding to AMd is not output. Therefore, in a sector in which it is detected that there is no error in at least one address field (address information+error detection code), it is possible to synchronize the sector sync counter 202 on the basis of the timing of the CRCOK pulse without fail (shown by CCP-ec and CCP-ed in this example) and synchronize the sector sync counter 202 on the basis of the timing of the AM detection pulse AMDP only in a sector in which only an address mark is detected.

In an optical disk having a data format of a header field including a plurality of address fields comprising at least (address mark field+address information field+error detection code field) in each sector, every address mark generally has the same pattern, and the number of the address field including the address mark among a plurality of ad dress fields can be determined by checking a specific bit of an address information field in many cases. When the above data format is used, it can be said that the CRCOK pulse has a reliability for specifying a position higher than that of the AM detection pulse AMDP. From the above viewpoint, after correcting a counted value at the timing of detecting that there is no error in (address information+error detection code) in each sector, it is possible to accurately adjust the data recording/reproducing timing and keep the liability of an apparatus high as this example by synchronizing with the timing of the CRCOK pulse as a criterion so as not to correct a counted value at the address-mark detection. timing.

FIG. 7 is a timing chart for explaining the timing-signal generating operation of the counted-value decoder 203 in this embodiment. When the counted-value decoder 203 receives a recording command RECCOM when recording data as described above, it outputs a write gate signal WGS to the laser driving section 108 and outputs various enable signals ENBL necessary for modulation, that is, a VFO enable signal ENBLa, data enable signal ENBLb, rear-guard enable signal EMBLc, and sync-code enable signal ENBLd.

Figures 7A, 7B, 7C, 7D, 7E, 7F:
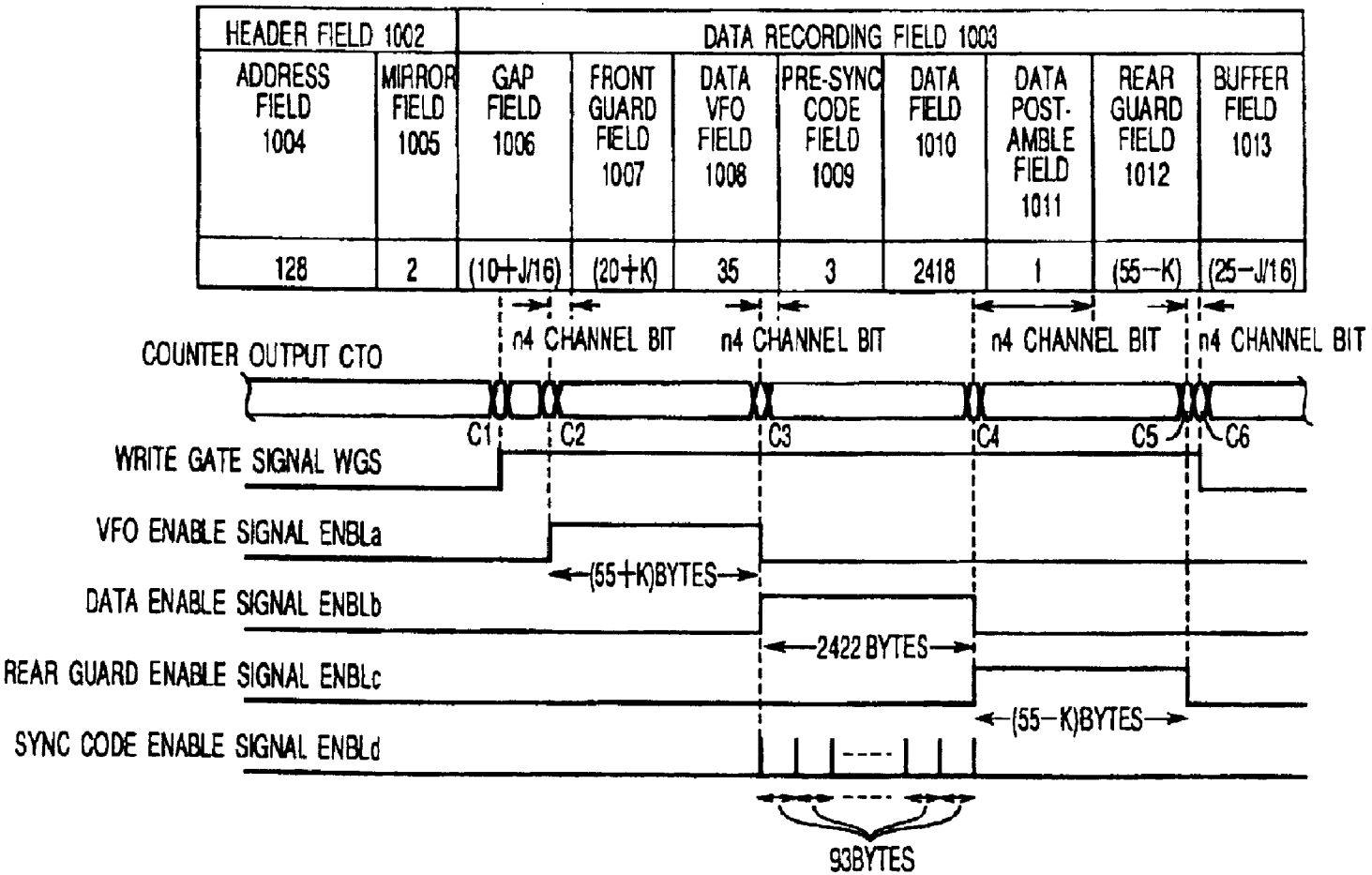
FIGS. 7(a), (b), (c), (d), (e) and (f) are timing charts for explaining operations of a counted-value decoding means 203 in one embodiment of the present invention.

In FIG. 7, the write gate signal WGS is a gate signal for allowing the laser driving section 108 to emit a recording laser power. By allowing the; recording laser power to be emitted only when the write gate signal WGS is kept H-level and thereby inhibiting emission of a high laser power at the time of reproduction (at the time of L level), it is possible to prevent a careless recording operation from being performed. Moreover, the write enable signal WGS makes it possible to control on/off of operations of a high-frequency module (not illustrated) built in the laser driving section 108. That is, by superimposing a high frequency on. a laser power only at the time of reproduction, it is possible to reduce laser noises and improve the S/N ratio of a reproduction signal. The counted-value decoder 203 keeps the write gate signal WGS H-level while the counter output CT0 has a value of c1 to (c6−1) as shown in FIGS. 7(a) and 7(b) by decoding the counter output CT0 supplied from the sector sync counter 202 in a sector to perform a recording. Thereby, it is possible to emit a recording laser power only in a range from c1 channel bit and c6 channel bit from the head of a sector to perform a recording.

The VFO enable signal ENBLa shown in FIG. 7(c) is a timing signal for urging the modulation section 115 to output patterns corresponding to the front guard field 1007 and data VFO field 1008. In the case of the data format used in this embodiment, a continuous pattern of 4T-mark·4T-space is recorded in the above fields. Therefore, the modulation section 115 operates so as to output the above patterns for the total (55+K) bytes while the VFO enable signal ENBLa is kept H-level. The counted-value decoder 203 decodes the counter output CT0 in a sector for recording and keeps the VFO enable signal ENBLa H-level while the counter output CT0 has a value of c2 to (c3−1).

The data enable signal ENBLb shown in FIG. 7(d) is a timing signal for urging the modulation section 115 to output modulation data patterns corresponding to the total 2,422 bytes of a pre-sync code field 1009, data field 1010, and data postamble field 1011. When the data enable signal EMBLb becomes H-level, the modulation section 115 first outputs patterns of a pre-sync code of 3 bytes and then outputs the data of total 2,418 bytes from the data field corresponding to a sync frame constituted of fieldr-sync code and modulated data, and finally outputs patterns of a data postamble of 1 byte. In the case of the data format in this embodiment, one sync frame in the data field is constituted of total 93 bytes including 2 bytes of a sync code and 91 bytes of modulated data and twenty-six frames of 93-byte sync frames (that is, 2,418 bytes) are output. The counted-value decoder 203 decodes the counter output CT0 in a sector for recording and keeps the data enable signal ENBLb H-level while the counter output CT0 has a value of c3 to (c4−1).

The sync-code enable signal ENBLd shown in FIG. 7(f) is used for controlling addition of a sync code, capture of pre-modulated data MPD, and data modulation. That is, the modulation section 115 operates so as to output a pattern corresponding to a sync code while the data enable signal ENBLb and sync-code enable signal ENBLd are H-level, and to capture and modulate the pre-modulated data and output a modulated-data pattern while the data enable signal ENBLb is H-level and the sync-code enable signal ENBLD is L-level. The counted-value decoder 203 decodes the counter output CT0 in a sector for recording and outputs H pulses of the sync-code enable signal ENBLd of 2 bytes from a counter output value of (c3+93×16×S). In this case, S is an integer from 0 to 25. Therefore, an H pulse having a two-byte width is output 26 times which is equal to the number of frames.

The rear guard enable signal ENBTc shown in FIG. 7(e) is a timing signal for urging the modulation section 115 to output a pattern corresponding to the rear guard field 1012. In the case of the data format in this embodiment, continuous patterns of 4T-mark·4T-space are recorded in the rear guard field 1012. Therefore, the modulation section 115 operates so as to output the above patterns equivalent to (55-K) bytes while the rear guard enable signal ENBLc is H-level. The counted-value decoder 203 decodes the counter output CT0 in a sector for recording and thereby keeps the rear guard enable signal ENBLd H-level while the counter output CT0 has a value of c4 to (c5−1).

In this embodiment, although the VFO enable signal ENBLa is separated from the rear guard enable signal ENBLd, according to the data format in this embodiment, the modulation section 115 outputs the same pattern when either of the signals is active, and therefore it is also permitted to use the signals as one common timing signal.

It is permitted to set decoded values corresponding to rise and fall of the timing signals, that is, values from c1 to c6 as shown below.

$$c1=132\times16$$

$$c2=140\times16+J-n4$$

$$c3=(195+K)\times16+J-n4$$

$$c4=(2617+K)\times16+J-n4$$

$$c5=2672\times16+J$$

In this case, n4 denotes the number of channel bits considering a circuit delay in the modulation section 115 and laser driving section 108 and a delay time until a light spot is actually applied to the recording film of the optical disk 101. That is, by adding the offset of n4 channel bits and generating the timing signals to the modulation section 115, it is possible to offset a delay time up to irradiation of the light spot and thereby to accurately decide a recording position.

Moreover, as to c1, since a recording laser power is set before recording the data of the front guard field 1007, it is set to the 132nd byte from the head of a sector in order to permit emission of a power exceeding a recording or reproducing power in a predetermined region of the gap field 1006. In the case of an apparatus which does not require the above preparatory laser emission period immediately before recording, the value of c1 may be set so that a recording power can be emitted by the start end of the front guard field 1007.

Moreover, J and K are random parameters for controlling deterioration of a recording film as described in the prior art. It is preferable to use means for selecting J and K at random every sector so that J is an integer from 0 to 15 and K is an integer from 0 to 7.

(Embodiment 2)

Figure 8:
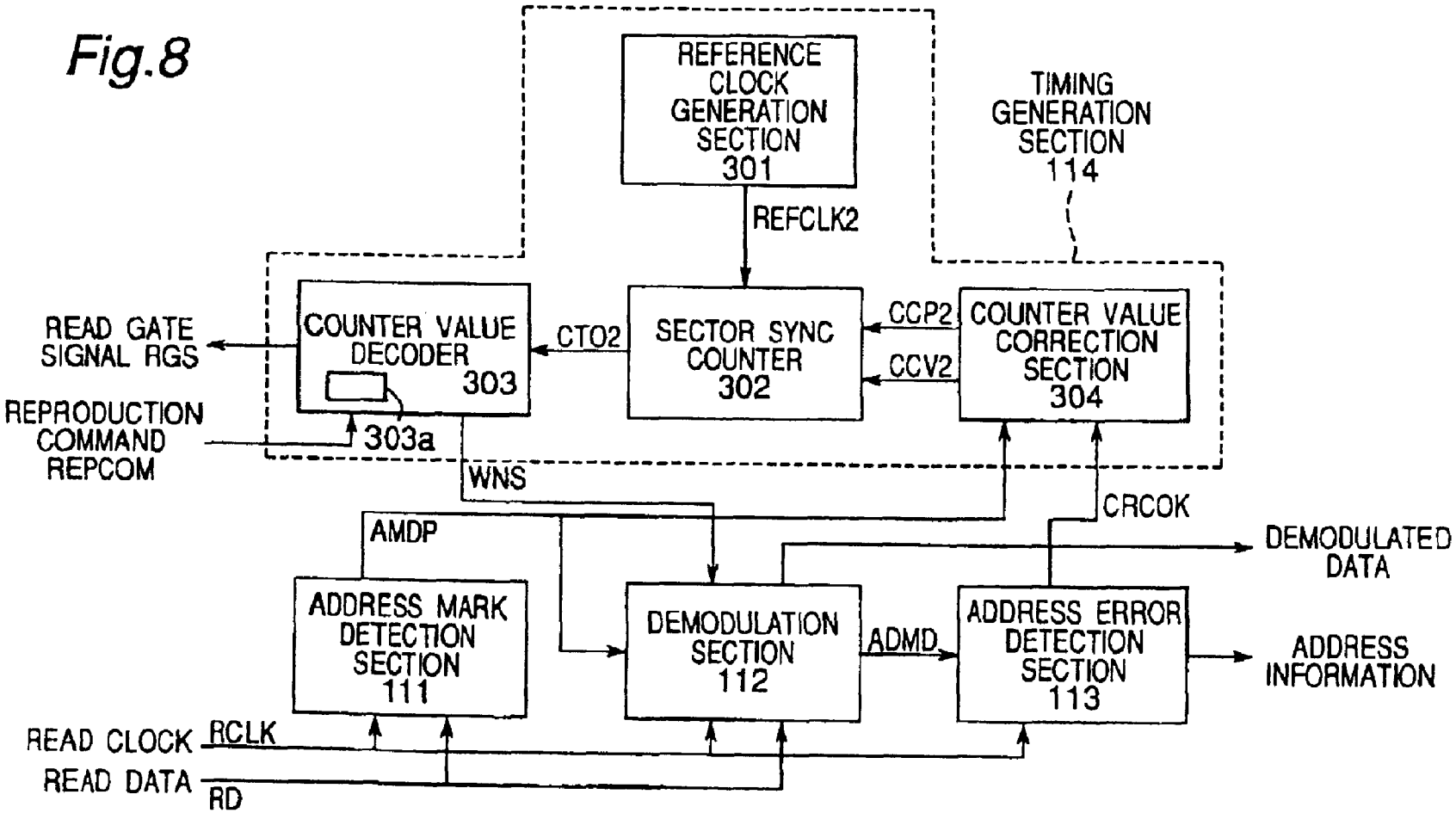
FIG. 8 is a block diagram showing a configuration example of an internal structure of timing generation means 114 and a periphery thereof in one embodiment of the present invention.

FIG. 8 is a block diagram showing a configuration example of a timing generation section 114 for reproducing data and its periphery according to a second embodiment of the present invention. In FIG. 8, an address mark detection section 111, demodulation section 112, and address error detection section 113 have the same functions as those described in FIGS. 1 and 3, and therefore, descriptions thereof are omitted here.

The timing generation section 114 in FIG. 8 has a function of generating a timing signal such as read gate signal RGS required to reproduce data. The timing generation section 114 is constituted of a reference-clock generation section 301, sector sync counter 302, counted-value decoder 303, and counted-value (counter value) correction section 304. Each of these functional block is described below.

The reference-clock generation section 301 generates a reference clock REFCLK2 serving as a criterion for reproducing data. In this embodiment, it is assumed that one cycle of the reference clock is equal to 4-channel-bit cycle of the data format shown in FIG. 2. As to a method of generating the reference dock, a plurality of methods are considered depending on the track format of an optical disk 101, which is similar to the case of describing the reference clock generation section in the recording operation shown in FIG. 3. Therefore, descriptions thereof is omitted here.

Moreover, in contrast to the case of recording, it is unnecessary to greatly suppress the jitter component of a clock because the jitter is not related to a quality of recording data. Because a timing signal required to reproduce data is generated by using the reference clock REFCLK2, it is permitted to use a frequency corresponding to a linear velocity. Therefore, it is permitted to use read clock RCLK output by the reproduction signal processing section 106 also as the reference clock REFCLK2.

The sector sync counter 302 is a counter for counting the reference clock REFCLK2 so that a counted value of the counter 302 shows a byte position in one sector. According to the data format shown in FIG. 2, one sector has a length of 2,697 bytes, that is, a length of 2,697×16=43,152 channel bits. When assuming that the reference clock REFCLK2 is a clock having a four-channel-bit cycle, it is possible to constitute the counter 302 of a 14-bit loop counter which counts from 0 up to 10,787 and then returns to 0 because a clock cycle of 2,697×16+4=10,788 corresponds to the length of one sector.

Moreover, it is necessary to synchronize the position of a light spot applied to the optical disk 101 with a counted value of the sector synch counter 302. Therefore, a mechanism is used which corrects a counted value by using a counted-value correction pulse CCP2 and a count correction value CCV2 output from the counted-value correction section 304. The counted-value correction section 304 receives an AM detection pulse AMDP from the address mark detection section 111 and a CRCOK pulse from the address error detection section 113 and outputs the counted-value correction pulse CCP2 and count correction value CCV2 to the sector sync counter 302.

Because the mechanism for counted-value correction can be realized by a method same as that described in FIGS. 3 to 6 for recording data in detail, description of the mechanism is omitted here. In this embodiment, it can be said that a counted value of a sector sync counter shows the position from the head of each sector in a unit of four-channel bits, that is, in 0.25 bytes unit and the counted value is output to an external unit as a counter output CT02.

The counted-value decoder 303 generates various timing signals synchronizing with the data format of a sector by decoding the counter output CT02 output from the sector sync counter 302. In this case, when the decoder 303 receives a reproduction command REPCOM from the system controller 110 when reproducing data, it outputs fieldd gate signal RGS to the reproduction signal processing section 106 and moreover outputs a window signal WNS necessary for detection of a pre-sync code and demodulation of data to the demodulation section 112. Details of generation of the timing signals are described below.

Figures 9A, 9B, 9C:
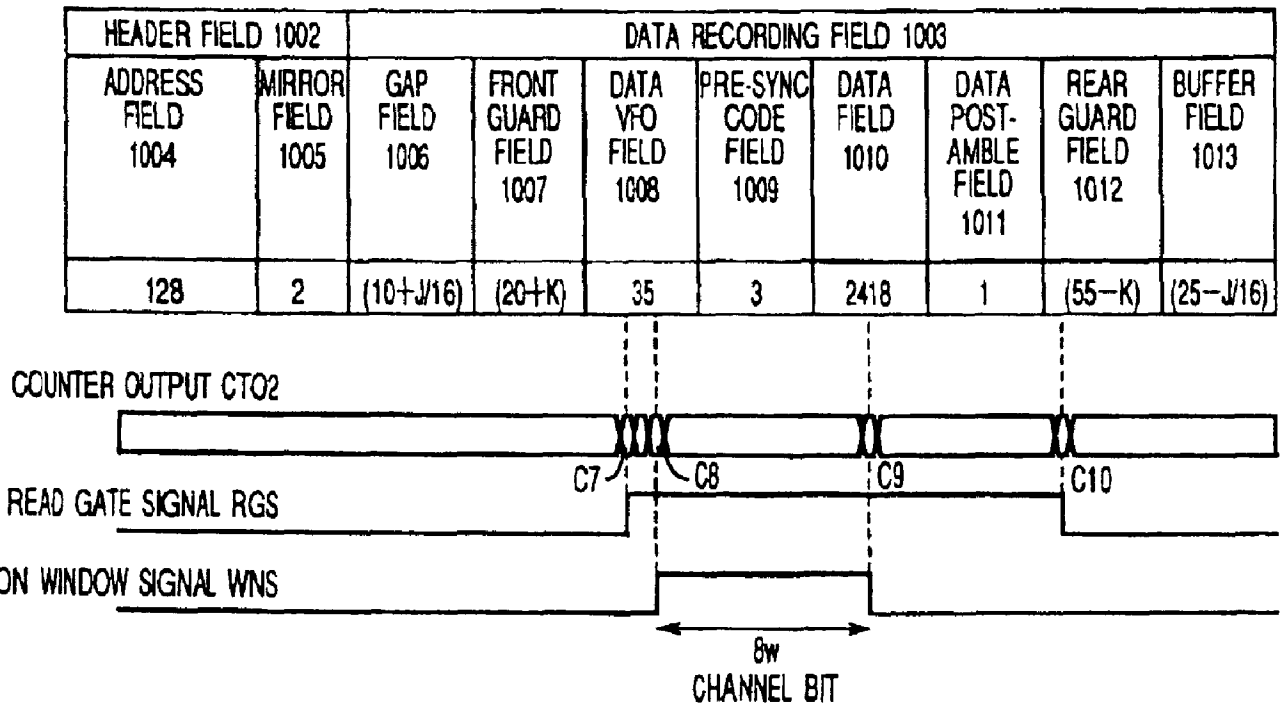
FIGS. 9(a), (b) and (c) are timing charts for explaining operations of counted-value decoding means 303 in one embodiment of the present invention.

FIGS. 9A to 9C are timing chart for explaining the timing generating operation of the counted-value decoding section 303 in this embodiment. In FIG. 9, the read gate signal RGS serves as a gate signal for allowing the reproduction-signal processing section 106 to binarize a reproduction signal and perform the PLL operation synchronizing with binarized data. By performing operations such as binarization and PLL only when the read gate signal RGS is kept H-level, it is possible to prevent an unnecessary reproducing operation from being performed at a portion in which data is not recorded and the operations are effective for stabilization of read clock and reduction of power consumption. The counted-value decoder 303 decodes the output CT02 shown in FIG. 9(a) in a sector for reproducing data and thereby keeps the read gate signal RSG shown in FIG. 9(b) H-level while the counter output CT02 has a value from c7 to (c10−1). Hereby, it is possible to perform binarization and PLL operation by the reproduction-signal processing section 106 in a period from c7 channel bit to c10 channel bit from the head of a sector for reproducing data.

The sync-detection window signal WNS shown in FIG. 9(c) is a window signal for allowing the demodulation means 112 to detect a pre-sync code pattern and/or a first-frame sync-code pattern in a data field. By detecting a pre-sync and a first frame sync only when the sync-detection-window signal WNS is kept H-level, it is possible to detect the sync code in a proper range and prevent the sync code from being erroneously detected or undetected.

The demodulation section 112 starts detection of patterns of a pre-sync code and a first-frame sync code when the sync-detection window signal WNS becomes H-level, and starts demodulation of data from the first frame when either of the patterns is detected. Moreover, as to frame sync detection from the second frame downward, it is assumed that the demodulation section 112 generates a window for detecting a following frame sync at the timing of detecting a pre-sync code or a fist-frame sync code to detect a sync within the above window. Moreover, when a frame sync code is not detected in a certain frame, the section 112 starts interpolation from the sync-detection timing immediately before.

Furthermore, when neither pattern of a pre-sync code nor pattern of a first-frame sync code is detected while the sync-detection window signal WNS is H-level, the operation for detecting a pre-sync code and first-frame sync code is stopped, and the sync detection window of the second frame is generated at a predetermined timing such as the fall timing of the sync-detection window signal WNS to perform the interpolation. It is needless to say that the data of each frame is demodulated by using the sync detection timing or interpolated sync timing.

Thus, by using the sync-detection window signal WNS and controlling the operation for detecting a pre-sync-code pattern and/or a first-frame sync code in a data field and detecting and interpolating syncs from either of the above pattern detection timings downward, it is possible to efficiently and stably secure frame sync and reproduce data at a high reliability. Particularly, in the case of the data format used in this embodiment, because a recording position using the parameters J and K is shifted at random, the position of a pre-sync-code field, in other words, the start position of the first frame of data changes at random in a range of 8 bytes. Therefore, it is very important to generate the sync-detection window signal WNS at a proper position by using the timing generation section 114 having the above sector sync counter 302.

The decoded values corresponding to rise and fall of timing signals, that is, values from c7 to c10 may be set as below.

$$c7=170\times4$$

$$c8=202\times4-w$$

$$c9=202\times4+w$$

$$c10=2619\times4$$

In this case, w denotes a parameter for deciding the window width of the sync-detection window signal WNS and in the above case, the window width becomes 8w channel bits. In the case of the sector sync counter 302 in this embodiment, because a counted value is expressed in a unit of 0.25 bytes, parameters of c7 to c10 are expressed in the form of (number of bytes×4).

Moreover, the rise position of the read gate signal RSG is set to a position located by 170 bytes after the head of a sector depending on the value of the above c7. This position corresponds to a position at which the read gate signal RSG rises and which is located 2 bytes after the front end of the data VFO field 1008 when a recording position is shifted rearmost, that is, when the parameter J is equal to 15 and the parameter K is equal to 7. Thereby, it is possible to start data binarization and PLL lead-in operation from the head of the data VFO field 1008 to the utmost while avoiding the front guard field 1007 in which a signal may be deteriorated. Thus, it is possible to stably and quickly reproduce data. To inhibit the reproducing operation in the front guard field 1007, a timing error permitted in the read gate signal RGS, that is, an permitted positional shift of the sector sync counter 302 is two bytes.

Moreover, when a recording position is present at the center in a range of random shift depending on the values of the above c8 and c9, for example, when J is equal to 0 and K is equal to 4, the pre-sync code field 1009 is set so that the end position of the field 1009 is brought to almost the center of the sync-detection window signal WNS. To make it possible to detect a pre-sync code even if a recording position is brought to any position in a random-shift range (8 bytes), it is necessary to set w so that at least 8w is larger than 8×16. Moreover, it is preferable to set w to 20 or more in order to securely detect the first frame sync in the data field 1010 following the pre-sync code field 1009 and provide a slight allowance to the sector sync counter 302. When setting w to an excessively large value, erroneous detection increases because a window width becomes too large. Therefore, w is set to a proper value through an experiment or the like.

Moreover, the fall position of the read gate signal RSG is brought to a position located by 2,619 bytes after the head of a sector depending on the value of the above c10. This position corresponds to a position at which the read gate signal RSG falls and which is located by two bytes after; the data postamble field 1011 when a recording position is shifted foremost, that is, when the parameter J is equal to 0 and the parameter K is equal to 0. Thereby, it is possible to securely reproduce the data up to the data postamble field 1011 even if the recording position is brought to any position in the random shift range (8 bytes). To securely reproduce the data up to the data postamble field 1011, a timing error permitted in the read gate signal RGS, that is, a permitted positional shift of the sector sync counter 302 becomes two bytes. Though it is permitted to set c10 to a value slightly larger than two bytes, if c10 is set to an excessively large value, a signal of the rear guard field 1012 which may be deteriorated is reproduced long. Therefore, this is not preferable because a problem may occur in the stability of PLL.

(Embodiment 3)

Figure 10:
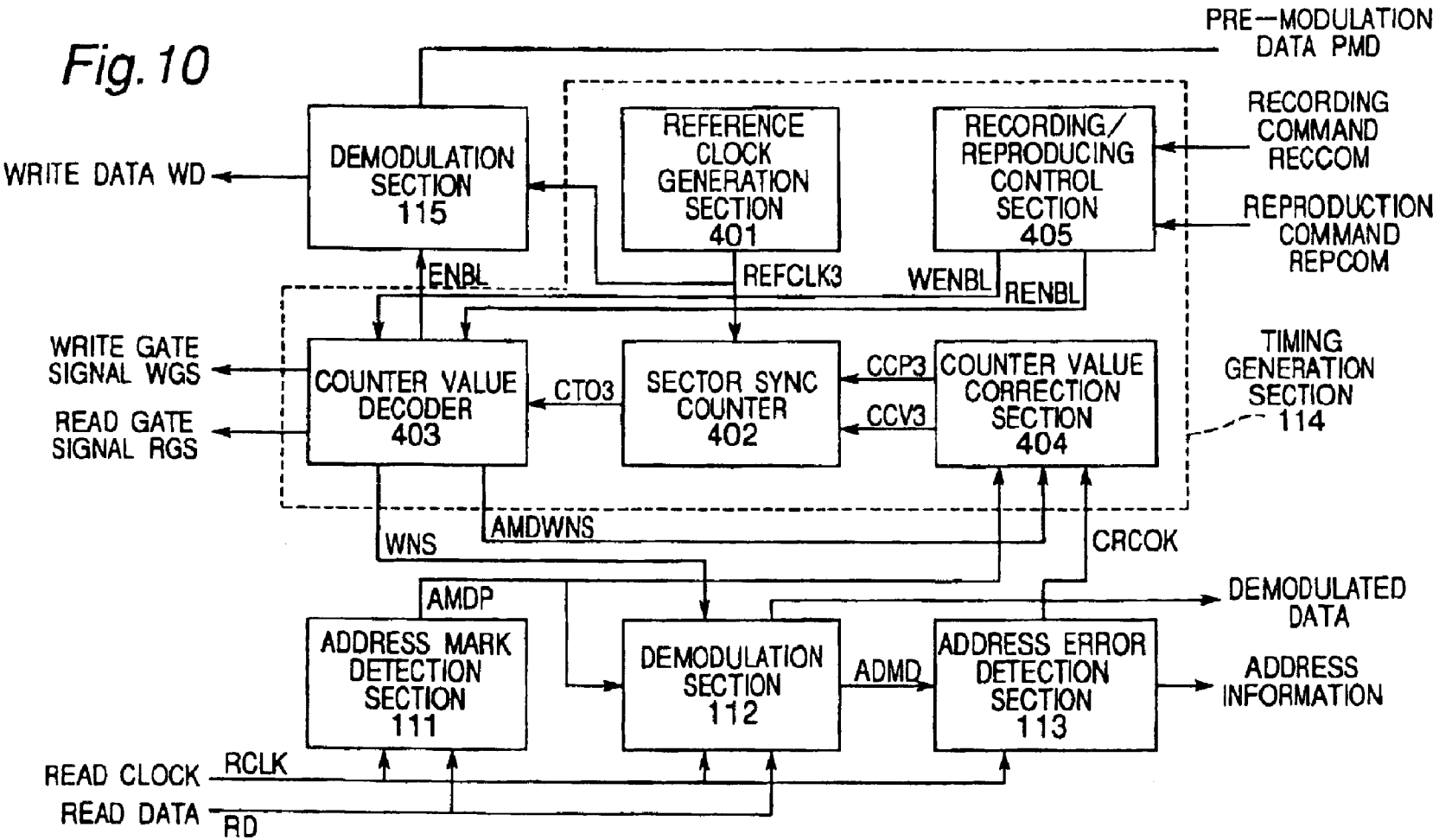
FIG. 10 is a block diagram showing a configuration example of an internal structure of timing generation means 114 and a periphery thereof in one embodiment of the present invention.

FIG. 10 is a block diagram showing a configuration example of a timing generation section 114 and its periphery according to a third embodiment of the present invention. In FIG. 10, because an address-mark detection section 111, demodulation section 112, address-error detection section 113, and modulation section 115 have the same functions as those described in FIGS. 1, 3, and 8, the descriptions are omitted here.

The timing generation section 114 in FIG. 10 has a function of generating various timing signals required to record and reproduce data, and is constituted of a reference-clock generation section 401, sector sync counter 402, counted-value decoder 403, counted-value correction section 404, and recording/reproducing control section 405. Operations of each functional block are described below.

The reference-clock generation section 401 generates a reference clock REFCLK3 serving as a criterion for recording and reproducing data. In this embodiment, it is assumed that the reference clock REFCLK3 has a one-channel-bit cycle of the data format shown in FIG. 2.

The sector sync counter 402 is a counter for counting the reference clock REFCLK3 so that a counted value of the counter 402 shows a byte position in one sector. In the case of the data format shown in FIG. 2, one sector has a length of 2,697 bytes, that is, a length of 2,697×16=43,152 channel bits. Therefore, it is possible to constitute the counter 402 of a 16-bit loop counter which counts from 0 to 43,151 in accordance with a reference clock and then returns to 0. Moreover, it is necessary to synchronize the position of a light spot applied to an optical disk 101 with a counted value of the sector sync counter 402. Therefore, a mechanism is used which corrects a counted value by using a counted-value correction pulse CCP3 and a count correction value CCV3.

The counted-value decoder 403 generates various timing signals synchronizing with the data format of a sector by decoding a counter output CT03 output from the sector sync counter 402. In this case, when the decoder 403 receives a write enable signal WENBL from the recording/reproducing control section 405 when recording data, it outputs a write gate signal WSG to a laser driving section 108 and moreover outputs an enable signal ENBL necessary for modulation to the modulation section 115. Details of timing-signal generation in recording data are omitted here because the details are the same as the contents described in FIG. 8.

Moreover, when the counted-value decoder 403 receives a read enable signal RENBL from the recording/reproducing control section 405 when reproducing data, the counted-value decoder 403 outputs a read gate signal RGS to a reproduction-signal processing section 106, and moreover, generates a window signal WNS, which is necessary for detection of a pre-sync code and the demodulation of data, and outputs the signal WNS to the demodulation section 112. Because details of timing signal generation when reproducing data are the same as the contents described in FIG. 9, description of the details is omitted here. The counted-value decoder 403 also generates an AM detection window signal AMDWNS and feeds back the signal AMDWNS to the counted-value correction section 404.

The counted-value correction section 404 outputs a counted-value correction pulse CCP3 and a count correction value CCV3 by using an AM detection pulse AMDD transmitted from the address mark detection section, CRCOK pulse transmitted from address error detection section 113 and AM detection window signal AMDWNS transmitted from the counted-value decoder 403.

The recording/reproducing control section 405 receives a recording command RECCOM from a system controller 110 when recording data and outputs a write enable signal WENBL in accordance with a predetermined criterion. Moreover, the recording/reproducing control section 405 receives a reproduction command REPCOM from the system controller 110 when reproducing data and outputs read enable signal RENBL in accordance with a predetermined criterion. Output algorithms of a write enable signal WENBL and read enable signal RENBL in each sector, that is, conditions for allowing data to be recorded and reproduced in each sector will be described later.

FIG. 11 is an illustration for explaining a counted-value correcting operation of the sector sync counter 402 in this embodiment. The operation example in FIG. 11 is characterized by controlling the count correction when detecting an address mark by using an AM detection window AMDWNS as described below.

Figures 11A, 11B, 11C, 11D, 11E, 11F, 11G, 11H, 11I:
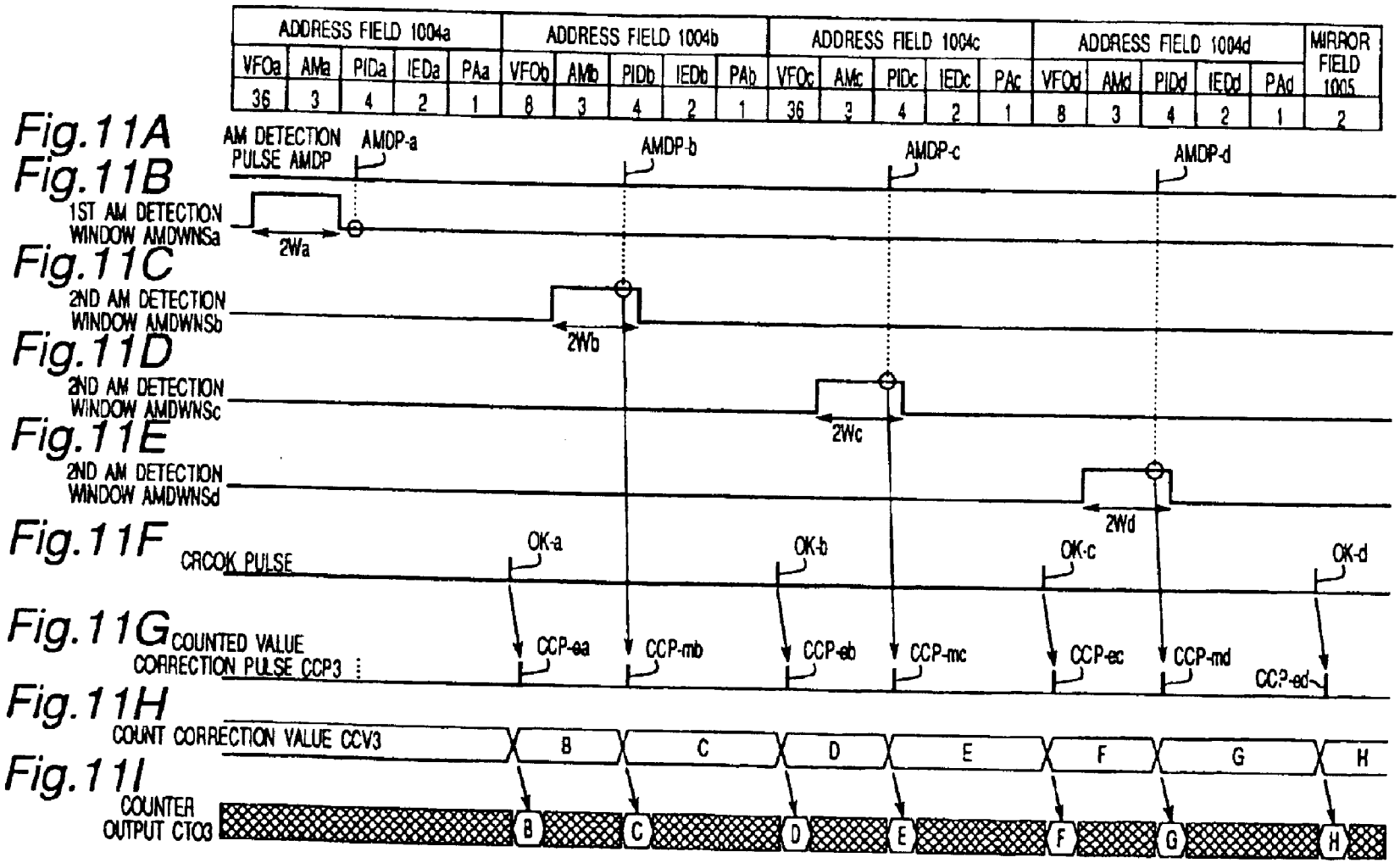
FIGS. 11(a), (b), (c), (d), (e), (f), (g), (h)) and (i) are timing charts for explaining an example of a counted-value correcting operation of a sector sync counter 402 in one embodiment of the present invention.

The first AM detection window AMDWNSa shown in FIG. 11(b) is a detection window for an address mark field AMa in a first address field 1004a, which is set to H level by the counter output CT03 of the sector sync counter 402 in a range of 2Wa channel bits about a counted value corresponding to the terminal position of the address mark field AMa. When H pulse of the AM detection pulse AMDP in which an address mark i s detected is output while the first AM detection window AMDWNSa is kept H-level, the counted-value correction section 404 outputs the counted-value correction pulse CCP3 as H pulse and sets the count correction value CCV3 to A at the timing of deciding the count correction value CCV3 at the H-level portion of the counted-value correction pulse CCP3.

In this example, the H-level period of the first AM detection window AMDWNSa is ended at the time of detection of an address mark i n the address mark field AMa as illustrated (illustrated by pulse AMPD-a). This represents that the sector sync counter 402 is greatly shifted in the early direction from an actual light-spot irradiation position at the above point of time. Therefore, the counted-value correction pulse CCP3 is not output at the above point of time and the sector sync counter 402 is not corrected (shown by a dotted line, that is, CCP-ma shown in FIG. 3 does not occur).

The second AM detection window AMDWNSb shown in FIG. 11(c) is a detection window for an address mark field AMb in an address field 1004b, which is set to H level by the counter output CT03 of the sector sync counter 402 in a range of 2Wb channel bits about a counted value corresponding to the terminal position, of the address mark field AMb. When an address mark is detected and H pulse of the AM detection pulse AMDP is output while the second AM detection window AMDWNSb is kept H-level (illustrated by AMDP-b), the counted-value correction section 404 outputs the counted-value correction pulse CCP3 as an H pulse (illustrated by CCP-mb) and sets the count correction value CCV3 to C at the timing of deciding the value CCV3 at the H-level portion of the counted-value correction pulse CCP3.

In this example, the time of detection of an address mark in the address mark field AMb is included in the H-level period of the second AM detection window AMDWNSb as illustrated. Therefore, the counted-value correction pulse CCP3 is output as an H pulse at the above point of time to correct the sector sync counter 402.

The third AM detection window AMDWNSc shown in FIG. 11(d) is a detection window for an address mark field AMc in the address field 1004c, which is set to H level by the counter output CT03 of the sector sync counter 402 in a range of 2Wc channel bits about a counted value corresponding to the terminal position of the address mark field AMc. As illustrated, when the H pulse of the AM detection pulse AMDP is output upon detecting an address mark while the third AM detection window AMDWNSc is kept H-level (illustrated by AMDP-c), the counted-value correction section 404 outputs the counted-value correction pulse CCP3 as an H pulse (illustrated by CCP-mc) and sets the count correction value CCV3 to E at the timing of deciding the value CCV3 at the H-level portion of the counted-value correction pulse CCP3.

The fourth AM detection window AMDWNSd shown in FIG. 11(e) is a detection window for an address mark field AMd in an address field 1604d, which is set to H level by the counter output CT03 of the sector sync counter 402 in a range of 2Wd channel bits about a counted value corresponding to the terminal position of the address mark field AMd. As illustrated, when an address mark is detected and the H pulse of the AM detection pulse AMDP is output while the fourth AM detection window MDWNSd is kept H-level (illustrated by AMDP-d), the counted-value correction section 404 outputs the counted-value correction pulse CCP3 as an H pulse (illustrated by CCP-md) and sets the count correction value CCV3 to G at the timing of deciding the value CCV3 at the H-level portion of the counted-value correction pulse CCP3.

As described above, by setting an individual AM detection window every address mark field, it is possible to easily identify which address field in a sector a detected address mark is included in. Moreover, because a counted value is not corrected even if an address mark is detected outside of an AM detection window, it is possible to prevent the synchronism of the sector sync counter 402 from being shifted due to erroneous detection of an address mark.

Furthermore, the counted-value correction by a CRCOK pulse is the same as the example in FIG. 4. That is, any one place is recognized among (address information field+error detection code fields) of the address fields 1004a, 1004b, 1004c, and 1004d, the counted-value correction pulse CCP3 is output as an H pulse, and the count correction value CCV3 is set to any one of B, D, F, and H.

It is preferable to decide parameters Wa, Wb, Wc, and Wd for deciding the time width of each AM detection window in consideration of a shift of the reference clock REFCLK3 from a track linear velocity every sector. Moreover, it is also permitted to set the parameters so as to be Wa=Wb=Wc=Wd. Thereby, time widths of the AM detection windows are equalized each other.

It is also possible to control whether to perform counted-value correction at the address-mark detection timing of a certain sector correspondingly to whether a CRCOK pulse is output in a sector which is located by M (M is a natural number) sectors before the sector concerned. For example, by setting M to 2 channel bits and Wa=Wb=Wc=Wd to 64 channel bits (i.e., 4bytes), a counted value is not corrected when address information with no error is not obtained within two sectors immediately before. Moreover, a counted-value shift of the sector sync counter 402 permitted between two sectors becomes ±4 bytes. That is, when a shift of the reference clock REFCLK3 from a track linear velocity that occurs between two sectors is within ±4 bytes, a counted value is corrected at the address mark detection timing.

Thereby, when the sector sync counter 402 operates completely independently of a light-spot irradiation position, a counted value is not corrected at the address-mark detection timing. Therefore, it is possible to prevent the synchronism of the sector sync counter 402 from being shifted due to erroneous recognition of an address mark.

Next, the following describes the output algorithms of the write enable signal WENBL and read enable signal RENBL in each sector by the recording/reproducing control section 405, that is, conditions for permitting recording/reproducing of data in each sector.

Figure 12:
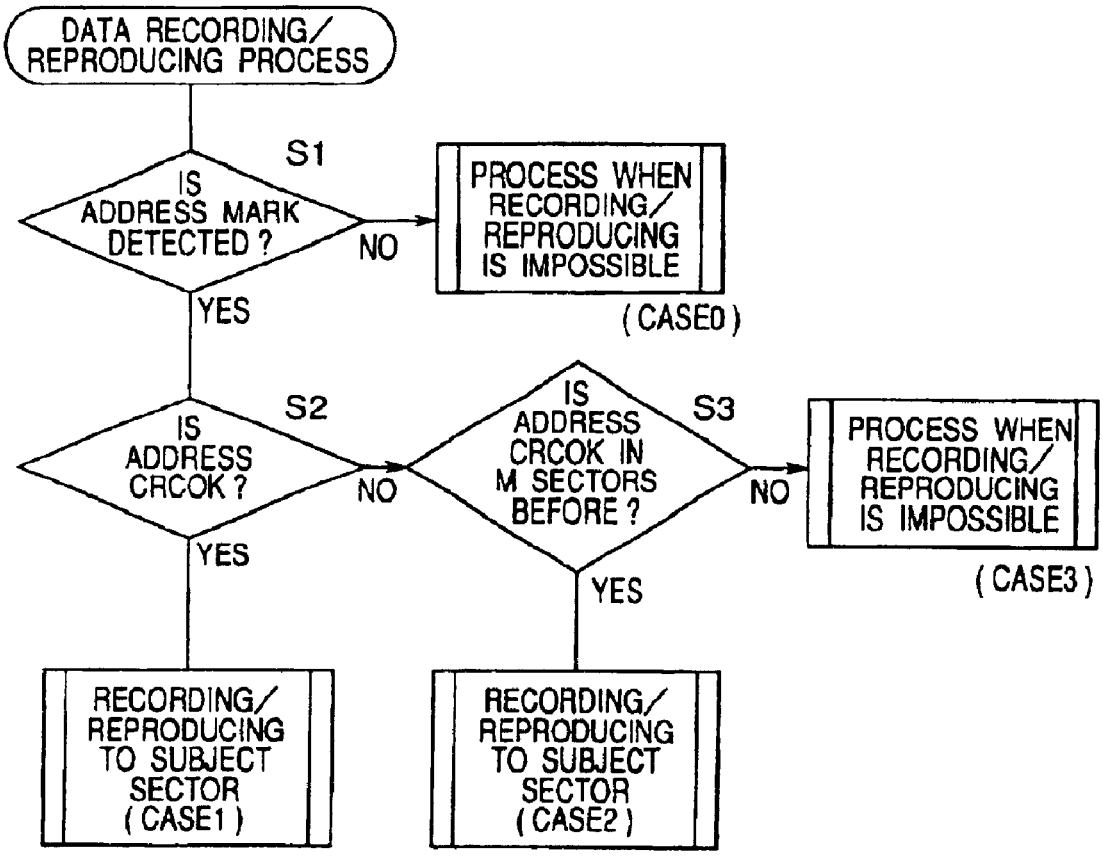
FIG. 12 is a flowchart for explaining a data recording/reproducing process in one embodiment of the present invention.

FIG. 12 is a flowchart for explaining an example of data recording/reproducing process in this embodiment. When a recording command RECCOM or reproducing command REPCOM is output in a certain sector, a data recording/reproducing process is started by the recording/reproducing control section 405.

First, it is determined whether an address mark is detected in the sector concerned (step 1). At this time, when even one address mark is detected in the sector concerned, it is regarded that an address mark is detected. However, as described in FIG. 11, when an AM detection window is provided, detection of an address mark outside the AM detection window is excluded from the above definition.

When it is determined in step 1 that no address mark is detected, recording/reproducing of data in the subject sector is not permitted and the program is advanced to a predetermined process when the recording/reproducing is impossible (case 0). In the case 0, there is considered an operation of shifting to a retry process for reproducing the sector concerned once more when data is reproduced, or a substitute sector recording process, so-called alternation processing, without recording the subject sector when data is recorded.

When it is determined in step 1 that an address mark is detected, it is determined whether no error is detected in address information, that is, whether a CRCOK pulse is output (step 2).

When it is determined in step 2 that CRCOK pulse is output, the program is advanced to a recording/reproducing process of the sector concerned (case 1). That is, the write enable signal WENBL is made active when data is recorded, or the read enable signal RENBL is made active when data is reproduced.

When it is determined in step 2 that no CRCOK pulse is output, it is determined whether no error is detected in address information in any of M sectors (M is a natural number) before the subject sector, i.e., whether a CRCOK pulse is output (step 3). In this case, it is preferable to set M to a value equal to the number of sectors for checking a CRCOK pulse serving as a criterion as to whether a counted value is corrected at the above address-mark detection timing.

When it is determined in step 3 that a CRCOK pulse is output, the program is advanced to a recording/reproducing process of the subject sector (case 2). That is, the write enable signal WENBL is made active when data is recorded, and the read enable signal RENBL is made active when data is reproduced.

When it is determined in step 3 that no CROCK pulse is output, data recording/reproducing of the subject sector is not permitted and the program is advanced to the predetermined recording/reproducing impossible process (case 3). It is assumed that the processing in case 3 is the same as the processing in case 0.

In the above-described processing steps, the recording/reproducing control section 405 permits recording/reproducing of data in each sector and outputs the write enable signal WENBL or read enable signal RENBL. Thereby, data is recorded or reproduced only in a sector in which a counted value of the sector sync counter 402 is corrected. Therefore, it is possible to accurately adjust the data recording/reproducing timing and keep the reliability of an apparatus high.

(Embodiment 4)

Figure 13:
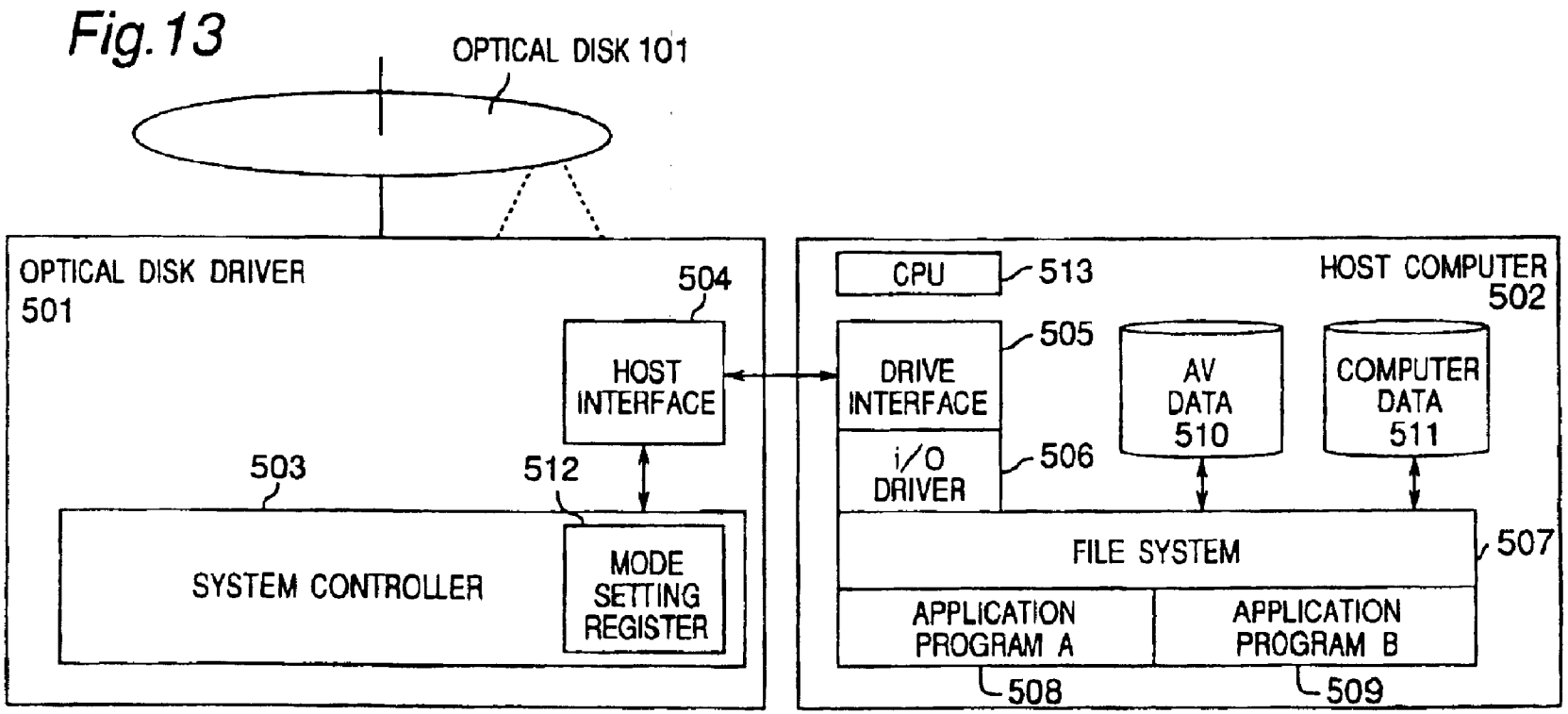
FIG. 13 is a block diagram showing a configuration example of an information: recording system according to the present invention.

FIG. 13 is a block diagram showing a configuration example of an information; recording system according to the present invention. In FIG. 13, it is assumed that an optical disk 101 has a data format as shown in FIG. 2. Moreover, it is assumed that an optical disk drive 501 basically has the configuration as shown in FIG. 1 and is able to at least record data to a predetermined sector of the optical disk 101.

A host computer 502 stores various application programs for handling the information including AV data 510 and computer data 511 as a database so as to record information in the optical disk 101 by executing these application programs and using the optical disk drive 501.

The optical disk drive 501 and the host computer 502 are connected each other by a host interface 504 built in the drive 501 and a drive interface 505 built in the computer 502 so that the information including the AV data 510 and computer data 511 and commands for recording the information can be transmitted.

A system controller 503 interprets a command transmitted via the host interface 504 and controls the whole of the optical disk 101 so as to record the transmitted information in a predetermined sector of the optical disk 101.

An i/o driver 506 issues a command to the optical disk drive 501 so that information is correctly recorded to a predetermined sector of the optical disk 101 and has a function of fetching the AV data 501 and computer data 511 via a file system 507 when necessity.

The file system 507 is software for handling the AV data 510 and computer data 511 as a plurality of file groups, adding a file attribute comprising file name, data length (number of data bytes), and type of file to each file, and performing the whole file management such as saving, deleting, and reading (opening) of a file.

The AV data 510 and computer data 511 fieldssumed as, for example, the data stored in a storage medium such as a hard disk or flash ROM or data to be input from the outside of or to be output to the outside of the information recording system. As inputs/outputs to and from the information recording system, various types fieldssumed as shown below: previously digitized information, video signals input through a video camera or microphone, data obtained by digitizing audio signals, character information and control instructions input through a keyboard, mouse, or touch panel, video and character information displayed on an external display unit such as a television monitor or liquid-crystal display, and audio information output to a loudspeaker.

An application program A508 and application program B509 are software for handing the AV data 510 and/or computer data 511 through the file system 507, processing information, and storing the information necessary for the optical disk 101 or other storage medium.

The host computer 502 is provided with a central processing unit CPU513 for executing a program and performing calculation, a semiconductor memory used to temporarily store data or a program though not illustrated, or auxiliary memory such as a hard disk for storing/memorizing data according to necessity, and the above hardware is organically operated based on each application program, thereby allowing to execute the predetermined functions.

In general, field1-time performance is requested in many cases for the operation of recording the AV data 510 in the optical disk 101. For example, a state is assumed that video information obtained by digitizing a video signal supplied from a camera is handled as the AV data 510 and the video information is recorded to the optical disk 101. In this case, to continuously record pictures supplied from the camera to the optical disk 101, it is requested to transmit the AV data 510 from the host computer 502 to the optical disk drive 501 at a predetermined rate and record the data 510 in the optical disk 101, that is, a predetermined transfer rate is requested.

Moreover, in the case of a certain type of AV data 510, even if an error is included in a part of data, it is possible to repair the data 510 so that the repair is not known by a user. Frame interpolation in a video signal or linear interpolation by data samples before and after an audio signal corresponds to the above repair.

Therefore, to record the real-time information such as the AV data 510 continuously input to the optical disk 101, it is preferable to record the data without interruption, while permitting a small number of errors even in a state where data errors easily occur due to a medium defect of the optical disk 101 or the like.

However, the real-time performance is not always requested for the operation of recording the computer data 511 handled by a conventional personal computer to an optical disk. Moreover, because a fatal influence is given to a system even if there is a small number of errors in the computer data 511, occurrence of an data error cannot be permitted.

In the above-described information recording system for recording the information including the AV data 510 having the realtime characteristic and the computer data 511 that cannot permit an error, several methods for improving the reliability of an apparatus are described below by listing a plurality of examples. Specifically, a transfer-rate priority recording mode is used for the data which can permit a small number of data errors but for which field1-time characteristic is requested while a transfer-rate non-priority recording mode is used for the data which cannot permit an error.

The above transfer-rate priority recording mode is a mode for preventing a transfer rate from lowering by continuously recording data even in a state in which a small number of errors may occur when recording the data in a sector. The state in which data errors may occur can be classified into two states such as a state in which a data error occurs and a state in which an address information error occurs.

As for the data error, an idea of assuring the quality of recorded data by verifying the data is used in the case of a conventional computer memory. Verifying is to verify whether the data has an error rate that the data can be sufficiently retrieved through error correction by reproducing data immediately after the data is recorded. As a verifying method, there is considered a method in which data before demodulated is kept when e.g. recording, and the data is compared with data after demodulated to thereby measure a byte error rate and determine whether the byte error rate is equal to or less than a predetermined criterion.

However, due to performing the verifying operation, a problem occurs that the normal recording-sequence-execution time increases. This is because verifying requires the time for reproducing data and determining the quality of the reproduced data. Therefore, it is possible to prevent a data transfer rate when recording from being deteriorated by performing no verifying operation.

As for an address-information error, a conventional computer memory does not record data to a sector in which errors equal to or more than a predetermined criterion are detected in address information. For example, in the case of an optical disk having the data format shown in FIG. 2, because address information is recorded in each sector a plurality of times, it is used as a predetermined criterion that the number of pieces of address information reproduced with no error is equal to or more than a predetermined number among the plural pieces of address information. Moreover, it is general to record data in the above sector through retrying. As the content of retrying, it is general to perform the alteration processing for recording data in a predetermined substitute sector when errors equal to or more than a predetermined criterion are detected as a result of recording data in the sector having the same address again.

However, because the recording-sequence execution time is increased due to the recording retrying or alteration processing applied to the same sector, a problem occurs that a data transfer rate for recording is lowered. Therefore, by continuously performing recording even if errors equal to or more than a predetermined criterion are detected in address information, it is possible to prevent the data transfer rate in the recording from being deteriorated.

Figure 14:
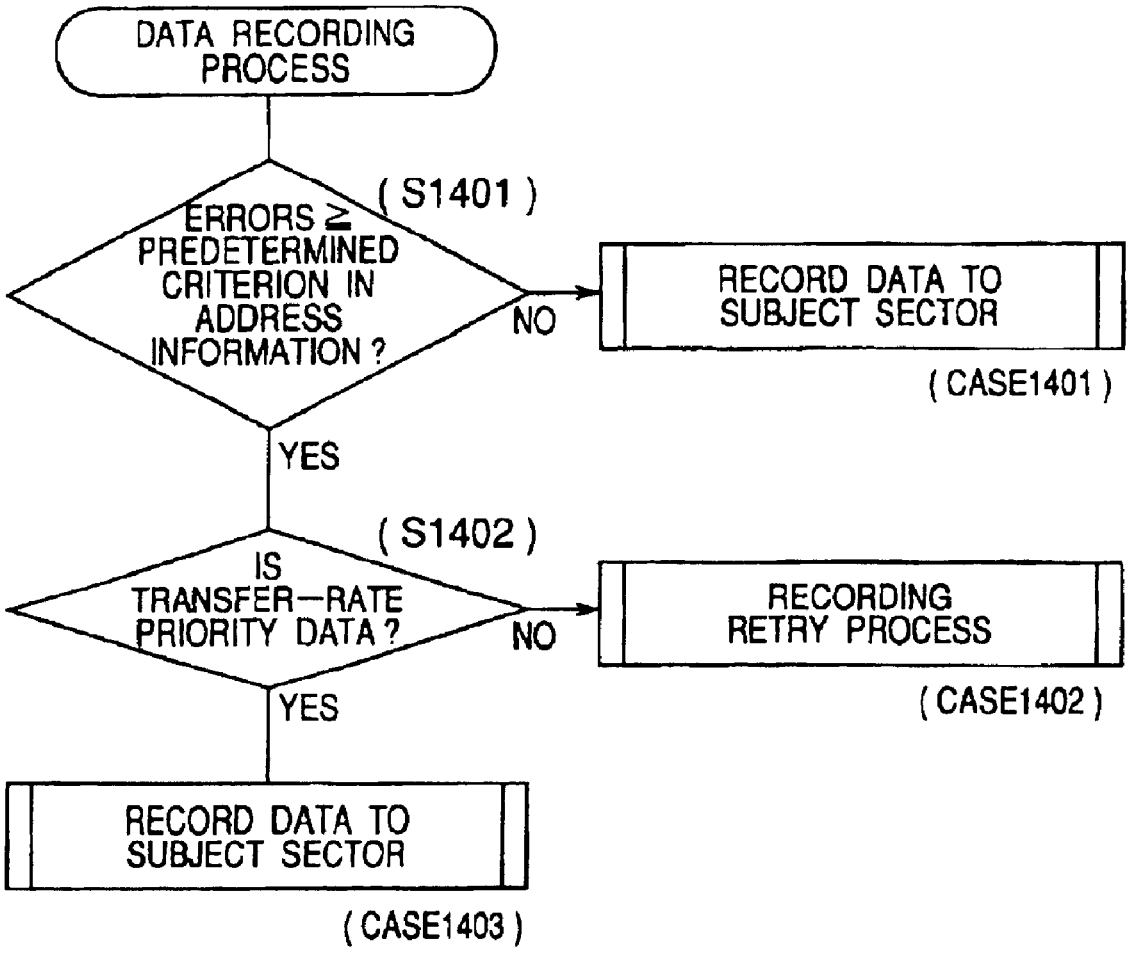
FIG. 14 is a flowchart for explaining a data recording process in one embodiment of the present invention.

FIG. 14 is a flowchart showing an example of data recording in this embodiment. In FIG. 14, when data is recorded to a predetermined sector, it is first determined whether errors equal to or more than a predetermined criterion are included in address information (step 1401). When errors are less than the predetermined criterion (arrow of NO), the data is recorded to the subject sector (case 1401). When errors are equal to or more than the predetermined criterion (arrow of YES), it is determined whether the data to be recorded is transfer-rate priority data (step 1402). When the data is not transfer-rate priority data, recording of the data to the subject sector is interrupted and recording retry is executed (case 1402). When the data is transfer-rate priority data, the data is recorded to the subject sector (case 1403).

By recording data in accordance with the flow as described above, only the transfer-rate-priority data is continuously recorded to the subject sector (case 1403) in the case where errors equal to or more than the predetermined criterion are included in the address information and where recording has been conventionally transferred to a retry process. That is, by selecting the data recording which has the highest priority to the fact of not lowering a transfer rate as for transfer-rate-priority data and selecting the data recording which has priority to the fact of not causing data errors as for the data in which it is unnecessary to have priority to a transfer rate, it is possible to meet a performance requested to the both cases.

It is permitted that the sequence of step 1401 and step 1402 is reversed and advantages to be obtained are the same.

Figure 15:
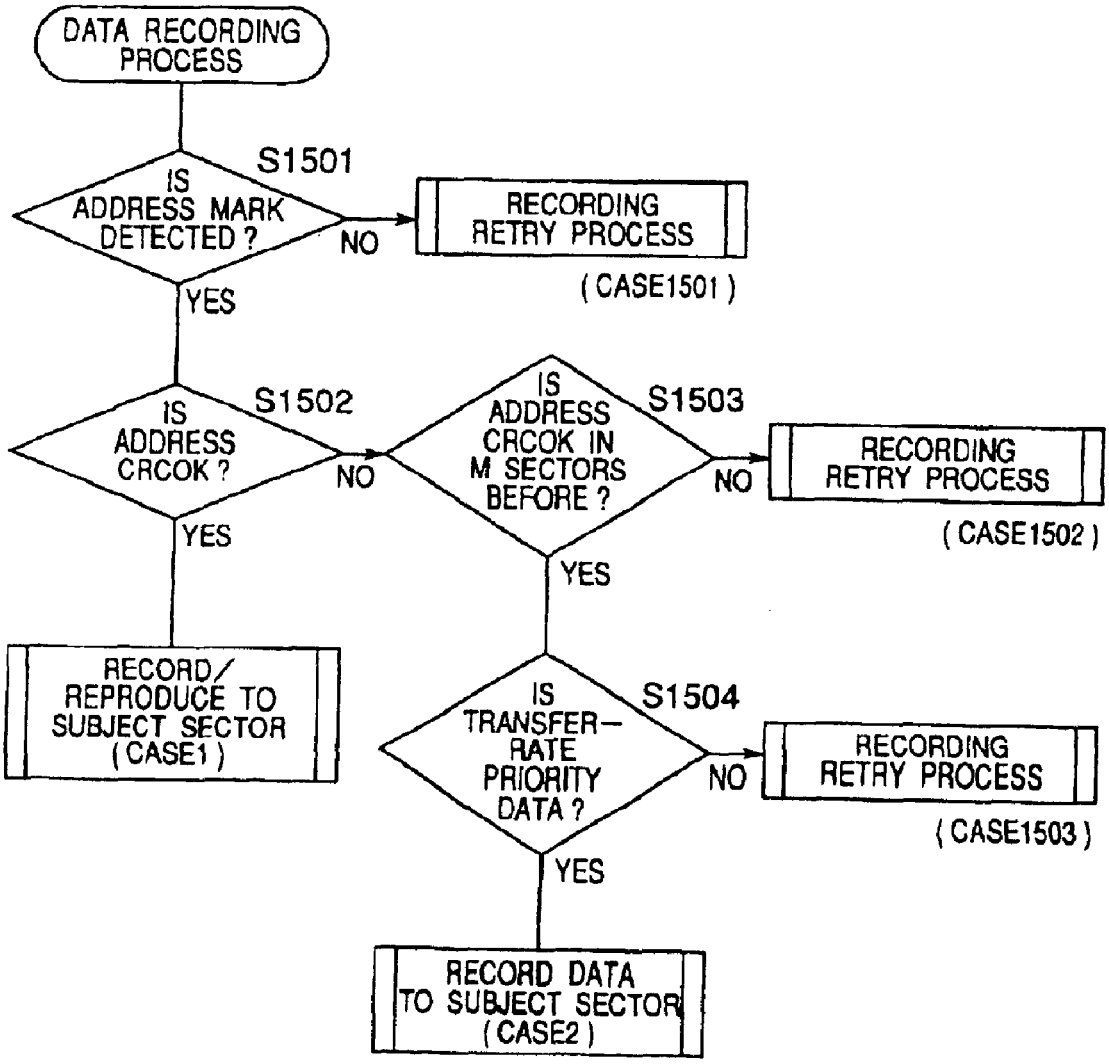
FIG. 15 is a flowchart for explaining a data recording process in one embodiment of the present invention.

FIG. 15 shows another example of the data recording process in this embodiment, which is a flowchart more minutely describing the processing in step 1401 in the flow in FIG. 14 as a specific example. In FIG. 15, when data is recorded to a predetermined sector, it is first determined whether an address mark is detected in the subject sector (step 1501). When no address mark is detected, the process is transferred to a recording retry process (Case 1501). When an address mark is detected, it is determined whether address information having no error is obtained from the sector (that is, whether there is CRCOK) (step 1502). When the address information with no error is obtained, data is recorded to the subject sector (Case 1). When even a piece of address information having no error is not obtained, it is determined whether there is a sector obtaining address information having no error in M (M is a natural number) sectors before the sector concerned (step 1503).

When there is a not a sector obtaining address information with no error in the period up to the precedent M sectors, the process goes to a recording retry process (Case 1502). When address information with no error is obtained in the period up to the precedent M sectors, it is further determined whether the data to be recorded is transfer-rate priority data (step 1504). When the data is not transfer-rate priority data (that is, when the data is transfer-rate-nonpriority data), recording of data in the subject sector is stopped and a recording retry process is executed (Case 1503). When the data is transfer-rate priority data, the data is recorded to the subject sector (Case 2).

By recording data in accordance with the flow as described above, similarly to the case of the example in FIG. 14, in the case where the process is conventionally transferred to a recording retry process when errors equal to or more than a predetermined criterion are included in the address information, only transfer-rate priority data is continuously recorded to the subject sector without interrupting the recording.

Moreover, it is one of the features of this example to include a determination whether an address mark is detected in criteria (step 1501) so as not to record data to a sector from which no address mark is detected. Thus, by combining the above feature with a method of deciding the recording start timing in accordance with the address-mark detection timing as described in an optical-disk recording apparatus of the present invention, it is possible to record data at a high timing accuracy.

Moreover, it is also one of the features of this example that the fact that at least address information with no error is obtained from any one of sectors up to precedent M sectors (YES in step 1503) is used as a condition for recording data in the sector concerned even when address information with no error is not obtained from the sector concerned. Thereby, data is recorded only to the sector for which the timing of the sector sync counter is corrected as described in the optical-disk recording apparatus of the present invention. Therefore, it is possible to accurately adjust the data recording/reproducing timing and keep the reliability of the apparatus high.

The flow of this example includes four types of determination processings such as steps 1501, 1502, 1503, and 1504. However, the sequence of determination steps is not restricted to the example in FIG. 14. For example, it is also possible to first execute the processing of step 1504 and in this case, the same advantage is obtained.

Then, as to how to determine the transfer-rate-priority data will be described below in detail. First, how to determine whether to perform the transfer-rate-priority processing when the optical disk drive 501 records data to the optical disk 101, the following two methods are considered.

(1) To make determination in accordance with the content of a command issued to the optical disk drive 501 from the host computer 502.

(2) To make determination in accordance with the content of a mode set to the optical disk drive 501 from the host computer 502.

Figure 16:
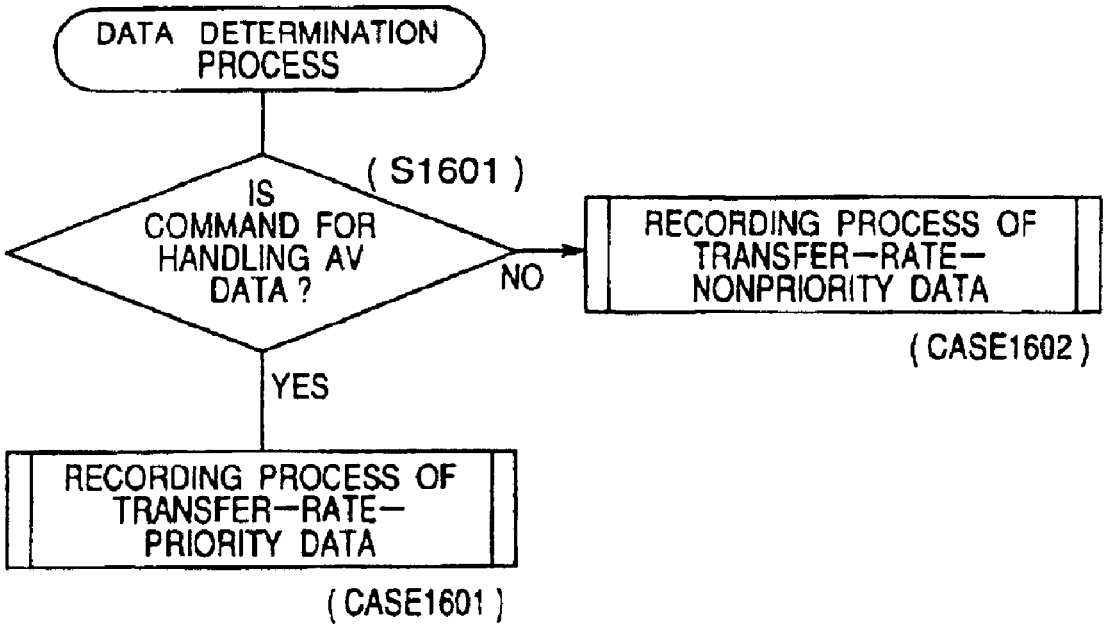
FIG. 16 is a flowchart for explaining a data determination process in one embodiment of the present invention.

For the above method (1), a processing example is shown in FIG. 16. In FIG. 16, step 1601 for determining whether a command is for handling AV data, and when it is determined that the command is a command for handling AV data, transfer-rate-priority data recording process is executed (Case 1601). When it is determined that the command is not a command for handling AV data, transfer-rate-nonpriority data recording process is executed (Case 1602).

The transfer-rate-priority-data recording process represents the processing for continuously recording data to the subject sector without performing a recording retry processing or alternation processing as possible even if an error is detected in address information. The transfer-rate-nonpriority-data recording process represents the processing of retrying recording or performing alternation processing as positively as possible by giving the highest priority to the fact that no data error occurs when it is presumed that an error may occur.

A command (referred to as host command) for defining the content of a certain typical processing is prescribed between the host computer 502 and the optical disk drive 501. To record the AV data 510 continuously transmitted, a first host command is prepared which assures a recording data transfer rate equal to or more than a predetermined criterion. Whereas, in the case of recording the data such as computer data 511 whose transfer rate is not seriously considered but which cannot permit an error, a second command is prepared which does not have a condition of a recording data transfer rate. Note that it is permitted to use a first host command and a second host command different from each other or to optionally change the same command.

To perform processing by including the method (1) in the flow in FIG. 14 or 15, it is preferable to replace step 1402 with step 1601. Then, advantages same as described above are obtained.

Moreover, the method (1) makes it possible to easily change transfer-rate priority and nonpriority processings in commands unit from the host computer 502 to the optical disk drive 501. Therefore, the method (1) is effective for a case in which the AV data 510 and the computer data 511 are transferred in mixture.

In this case, the file system 507 shown in FIG. 13 conduct file management by adding to the attribute of each file to be handled a code capable of determining whether priority is given to a transfer rate. For example, it is preferable to add a transfer-rate-priority code to each file belonging to the AV data 510 and add a transfer-rate-nonpriority code to each file belonging to the computer data 511.

Thus, even if a file included in the AV data 510 and a file included in the computer data 511 are handled in mixture by an application A or application B, it is possible to easily select whether to issue the first host command or second host command to the optical disk drive 501 by referring to the file attribute by the file system 507 or i/o driver 506.

Figure 17:
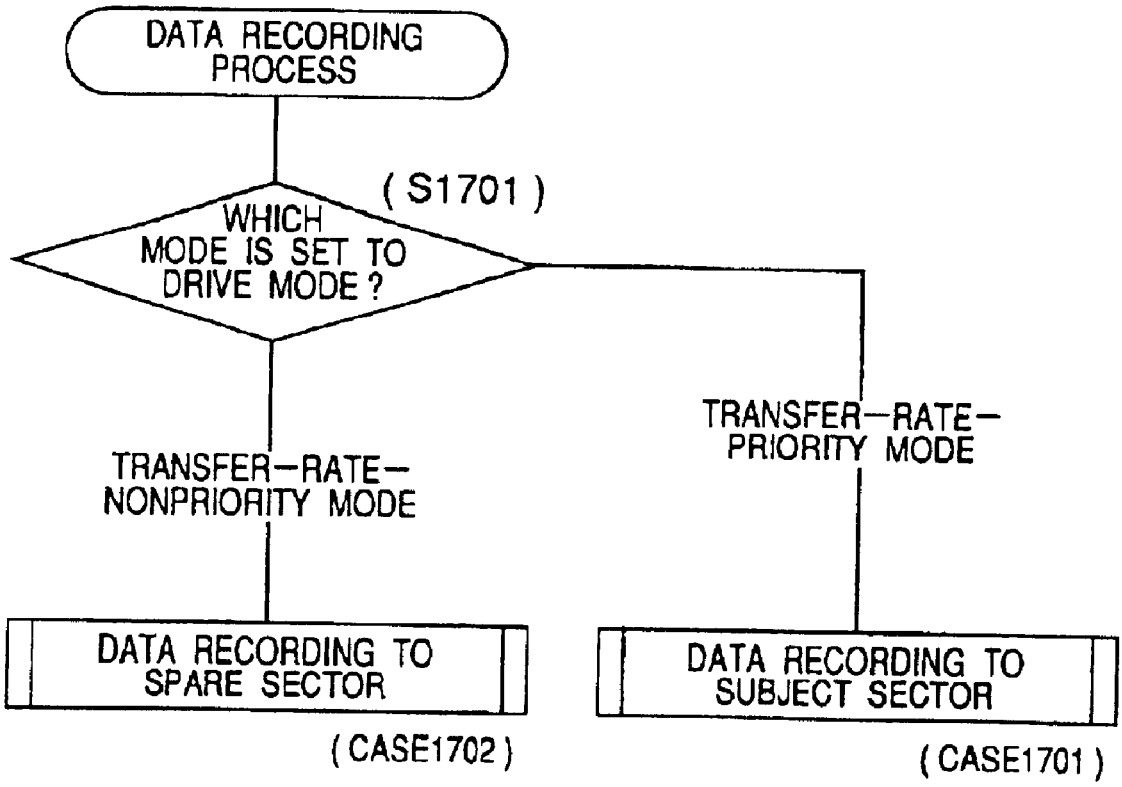
FIG. 17 is a flowchart for explaining a data recording process in one embodiment of the present invention.

On the other hand, for the method (2), a processing is shown in FIG. 17. In FIG. 17, mode setting of whether to perform the transferrate-priority processing is previously provided. It is preferable to perform the mode setting by setting a mode setting register 512 to the system controller 503 built in the optical disk drive 501 and rewriting the contents of the mode setting register. Moreover, it is permitted to perform the mode setting by making the host computer 502 directly rewrite the mode setting register 512 through the driving interface 505 and host interface 504, or by providing a mode setting command from the host computer 502 to the optical disk drive 501 so that the system controller 503 receiving the mode setting command rewrites the mode setting register.

In this case, a mode for performing the transfer-rate-priority processing is referred to as a transfer-rate-priority mode and a mode for performing the transfer-rate-nonpriority processing is referred to as a transfer-rate-nonpriority mode. In the case of data recording, the system controller 503 first reads the content of the mode setting register 512 and thereby determines which of the modes is set as a drive-mode (step 1701). When the drive mode is set to the transfer-rate-priority mode, the controller 503 performs a transfer-rate-priority data recording process (case 1701). When the drive mode is set to the transfer-rate-nonpriority mode, it performs a transfer-rate-nonpriority data recording process (Case 1702).

To perform processing by including the method (2) into the flow in FIG. 14 or 15, it is preferable to replace step 1402 with step 1701. Then, advantages same as described above are obtained.

Moreover, the method (2) makes it possible to easily change the processing mode of the optical disk drive 501 to the transfer-rate-priority mode or transfer-rate-nonpriority mode only by performing the mode setting. Therefore, the method (2) is an effective method in the case where it is possible to clearly separate an application for handling the AV data 510 and an application for handling the computer data 511 and where the both applications are not mixed.

In this case, it is assumed that the application program A 508 shown in FIG. 13 is a program for handling only the AV data 510 and the application program B 509 is a program for handling only computer data. Moreover, it is assumed that the above two applications cannot be executed at the same time.

When the application program A 508 is activated, the i/o driver 506 first issues a command for setting the optical disk drive 501 to the transfer-rate-priority mode. Then, when the AV data 510 recorded to the optical disk 101, the optical disk drive 501 always operates in the transfer-rate-priority mode.

When the application B 509 is activated, the i/o driver 506 first issues a command for setting the optical disk drive 501 to the transfer-rate-nonpriority mode. Then, when the computer data 511 is recorded to the optical disk 101, the optical disk drive 501 always operates in the transfer-rate-nonpriority mode.

It is noted that the present invention is not restricted to the above embodiments but it is prescribed only in the contents set forth in claims.

INDUSTRIAL APPLICABILITY

As described above, according to the configurations of the optical-disk recording apparatuses or optical-disk reproducing apparatuses shown in the embodiments of the present invention, it is possible to decide the data-recording start timing or data-reproducing start timing in accordance with the timing of detecting an address mark. Therefore, it is possible to record or reproduce data even in a sector having an error in address information at a high accuracy, thereby improving the reliability of an apparatus.

Moreover, according to the configurations of the optical-disk recording apparatuses or optical-disk reproducing apparatuses shown in the embodiments of the present invention, it is possible to determine whether to record or reproduce data in a predetermined sector under the condition that address information with no error is obtained from the subject sector or that address information with no error is obtained from at least a certain sector up to predetermined sectors preceding the subject sector and an address mark is detected in the subject sector. Therefore, data is recorded or reproduced only in a sector capable of generating an accurate timing by correcting the sector sync timing in the subject sector, and thus the reliability of an apparatus can be improved.

Furthermore, according to the optical-disk recording methods shown in the embodiments of the present invention, it is determined whether data is transfer-rate-priority data or transfer-rate-nonpriority data which cannot permit an error and only the transfer-rate-priority data is recorded in a transfer-rate-priority recording process, it is possible to minutely correspond to the performance of an apparatus requested for each data.

Therefore, by applying the present invention to an information recording system handling multimedia including computer data and real-time AV data, it is possible to provide a high-speed and high-reliability system and thus, the present invention is very effective in practical use.

What is claimed is:

1. An optical-disk recording apparatus for recording data in a data recording field of an optical disk having a sector structure constituted of a header field previously storing address information and a data recording field for storing data, the header field including an address mark field storing an address mark showing a beginning of address information, an address information field storing address information, and an error detection code field storing an error detection code for detecting an error in the address information field, said optical-disk recording apparatus comprising:

address-mark detection means for detecting an address mark stored in the address mark field of the sector; and data-recording decision and control means for deciding and controlling a period of recording data *in the data* recording field of the sector;

wherein said data-recording decision and control means uses an address-mark detection timing of said address-mark detection means in deciding and controlling the data recording period;

wherein said data-recording decision and control means includes address-information error detection means for detecting a presence or absence of an error in the address-information based on the address information and the error detection code, and timing generation means for generating a recording timing signal for deciding a data recording operation by using the address-mark detection timing of detecting the address mark by said address-mark detection means and a timing of detecting by said address-information error detection means that there is no error in the address information; and wherein said data-recording decision and control means, when recording data in the data recording field of a predetermined sector, permits data recording only where address information having no error is obtained as a result of error detection in the subject sector executed by said address-information error detection means, and where at least one piece of address information having no error is obtained in a predetermined number of sectors preceding the subject sector as a result of error detection by said address-information-error detection means and at least one address mark is detected in the address mark field of the subject sector.

2. An optical-disk recording apparatus for recording data in a data recording field of an optical disk having a sector structure constituted of a header field previously storing address information and a data recording field for storing data, the header field including an address mark *field storing an address mark* showing a beginning of address [informaiton] *information*, an address information field storing address information, and an error detection code field storing an error detection code for detecting an error in the address information field, said optical-disk recording apparatus comprising:

address-mark detection means for detecting an address mark stored in the address mark field of the sector; and data-recording decision and control means for deciding and controlling a period of recording data in the data recording field of the sector;

wherein said data-recording decision and control means uses an address-mark detection timing of said address-mark detection means in deciding and controlling the data recording period;

wherein said data-recording decision and control means includes address-information error detection means for detecting a presence or absence of an error in the address information based on the address information and the error detection code, and timing generation means for generating a recording timing signal for deciding a data recording operation by using the address-mark detection timing of detecting the address mark by said address-mark detection means and a timing of [detection] *detecting* by said address-information error detection means that there is no error in the address information; and [wherein said timing generation means includes]

*wherein said timing generation means includes* clock generation means for generating a reference clock serving as a criterion of recording data, counting means for count-specifying a position in one sector by using the reference clock generated by said clock generation means, counted-value correction means for correcting the counted values of said counting means with predetermined values at the address-mark detection timing of detecting the address mark by said address-mark detection means and the timing of detecting that there is no error in the address information by said address-information-error detection means, and decoding means for decoding the count output by said counting means corrected with the predetermined values to thereby produce the recording-timing signals.

3. The optical-disk recording apparatus according to claim 2, wherein said decoding means decodes the count output by said counting means to generate an address-mark detection window, permits said counted-value correction means to correct the counted value when the address-mark detection timing detected by said address-mark detection means is present within the address-mark detection window, and inhibits said counted-value correction means from correcting the counted value when the address-mark detection timing is not present within the address-mark detection window.

4. The optical-disk recording apparatus according to claim 2, wherein:

the header field in each sector includes a plurality of address fields each having an address mark field, an address information field, and an error detection code field; and when said address-information error detection means detects that there is no error in the address information in at least one address field in each sector, said timing generation means inhibits said counted-value correction means from correcting the counted value even if an address mark is detected in the subsequent address fields thereafter in the subject sector.

5. An optical-disk reproducing apparatus for reproducing data from a data recording field of an optical disk having a sector structure constituted of a header field previously storing address information and a data recording field for storing data, the header field [includes] *including* an address mark field storing an address mark showing a beginning of address information, an address information field storing address information, and an error detection code field storing an error detection code for detecting an error in the address information field, said optical-disk reproducing apparatus comprising:

address-mark detection means for detecting an address mark stored in the address mark field of the sector; and data-reproducing decision and control means for deciding and controlling a period of reproducing data from the data recording field of the sector;

wherein said data-reproducing decision and control means uses an address-mark detection timing of said address-mark detection means in deciding and controlling the data reproducing period;

wherein said data-reproducing decision and control means includes address-information error detection means for detecting a presence or absence of an error in the address information based on the address information and the error detection code, and timing generation means for generating a reproducing timing signal for deciding a data reproducing operation by using the address-mark detection timing detected by said address-mark detection means and a timing detected by said address-information error detection means of detecting that there is no error in the address information; and wherein said data-reproducing decision and control means, when reproducing data from the data recording field of a predetermined sector, permits data reproduction only where address information having no error detected is obtained as a result of error detection in the subject sector executed by said address-information error detection means, and where at least one piece of address information having no error detected is obtained in a predetermined number of sectors preceding the subject sector as a result of error detection by said address-information-error detection means and at least one address mark is detected in the address mark field of the subject sector.

6. An optical-disk reproducing apparatus for reproducing data from a data recording field of an optical disk having a sector structure constituted of a header field previously storing address [informaiton] *information* and a data recording field for storing data, the header field including an address mark field storing an address mark showing a beginning of address information, an address information field storing address information, and an error detection code field storing an error detection code for detecting an error in the address information field, said optical-disk reproducing apparatus comprising:

address-mark detection means for detecting an address mark stored in the address mark field of the sector; and data-reproducing decision and control means for deciding and controlling a period of reproducing data from the data recording field of the sector;

wherein said data-reproducing decision and control means uses an address-mark detection timing of said address-mark detection means in deciding and controlling the data reproducing period;

wherein said data-reproducing decision and control means includes address-information error detection means for [detection] *detecting* a presence or absence of an error in the address information based on the address information and the error detection code, and timing generation means for generating a reproducing timing signal for deciding a data reproducing operation by using the address-mark detection timing detected by said address-mark detection means and a timing detected by said address-information error detection means of detecting that there is no error in the address information; and wherein said timing generation means includes[:]

clock generation means for generating a reference clock serving as a criterion of reproducing data, counting means for count-specifying a position in one sector by using the reference clock generated by said clock generation means, counted-value correction means for correcting the counted values of said counting means with predetermined values at the address-mark detection timing of detecting the address mark by said address-mark detection means and a timing of detecting that there is no error in the address information by said address-information-error detection means, and decoding means for decoding the count output by said counting means corrected with the predetermined values to thereby produce the reproducing-timing signals.

7. The optical-disk reproducing apparatus according to claim 6, wherein said decoding means decodes said count output of said counting means to generate an address-mark detection window, permits said counted-value correction means to correct the counted value when the address-mark detection timing detected by said address-mark detection means is present within the address-mark detection window, and inhibits said counted-value correction means from correcting the counted value when the address-mark detection timing is not present within the address-mark detection window.

8. The optical-disk reproducing apparatus according to claim 6, wherein:

the header field in each sector includes a plurality of address fields each having an address mark field, an address information field, and an error detection code field; and when said address-information error detection means detects that there is no error in the address information in at least one address field in each sector, said timing generation means inhibits said counted-value correction means from correcting the counted value even if an address mark is detected in the subsequent address fields thereafter in the subject sector.

9. An optical-disk recording method for recording data in a data recording field of an optical disk having a sector structure constituted of a header field previously storing address information and a data recording field for storing data, the header field including an address mark field storing an address mark showing a beginning of address information, an address information field storing address information, and an error detection code field storing an error detection code for detecting an error in the address information field, said method comprising:

detecting an address mark stored in the address mark field of the sector; and deciding and controlling a period of recording data in the data recording field of the sector;

wherein said deciding and controlling of the data recording period uses an address-mark detection timing in deciding and controlling the data recording period;

wherein said deciding and controlling of the data recording period includes detecting a presence or absence of an error in the address information based on the address information and the error detection code, and generating a recording timing signal for deciding a data recording operation by using the address mark detection timing and a timing of detection in said detecting of the presence or absence of the error that there is no error in the address information; and wherein said deciding and controlling of the data recording period, when recording period, when recording data in the data recording field of a predetermined sector, permits data recording only where address information having no error detected is obtained as a result of error detection in the subject sector executed in said detecting of the presence or absence of an error, and where at least one piece of address information having no error detected is obtained in a predetermined number of sectors preceding the subject sector as a result of error detection and at least one address mark is detected in the address mark field of the subject sector.

10. An optical-disk recording method for recording data in a data recording field of an optical disk having a sector structure constituted of a header field previously storing address information and a data recording field for storing data, the header field including an address mark field storing an address mark showing a beginning of address information, an address information field storing address information, and an error detection code field storing an error detection code for detecting [code for detecting] an error in the address information field, said optical-disk recording method comprising:

detecting an address mark stored in the address mark field of the sector; and deciding and controlling a period of recording data in the data recording field of the sector;

wherein said deciding and controlling of the data recording period uses an address-mark detection timing in deciding and controlling the data recording period;

wherein said deciding and controlling of the data recording period includes detecting a presence or absence of an error in the address information based on the address information and the error detection code, and generating a recording timing signal for deciding a data recording operation by using the address mark detection timing and a timing of detecting in said detecting of the presence [of] *or* absence of an error that there is no error in the address information; and [wherein said generating of the recording timing signal includes]

*wherein said generating of the recording timing signal includes* generating a reference clock serving as a criterion of recording data, count-specifying a position in one sector by using the reference clock generated in said generating of the reference clock,

*correcting the* values counted in said count-specifying of the position in one sector with predetermined values at the address-mark detection timing of detecting the address mark and a timing of detecting that there is no error in the address information executed in said detecting of the presence or absence of an error, and decoding the counted value obtained in said count-specifying of the position in one sector corrected with the predetermined values to thereby produce the recording-timing signals.

11. The optical-disk recording method according to claim 10, wherein said decoding of the counted value decodes the counted value obtained in said count-specifying of the position in one sector to generate an address-mark detection window, permits the correction of the counted value in said correcting of the counted values when the address-mark detection timing is present within the address-mark detection window, and inhibits said correcting of the counted values from correcting *the* counted value when the address-mark detection timing is not present within the address-mark detection window.

12. The optical-disk recording method according to claim 10, wherein:

the header field in each sector includes a plurality of address fields each having an address mark field, an address information field, and an error detection code field; and when said detecting of the presence or absence of an error detects that there is no error in the address information in at least one address field in each sector, said generating of the recording timing signal inhibits the correction of the counted value in said correcting of the counted values even if an address mark is detected in the subsequent address fields thereafter in the subject sector.

13. An optical-disk reproducing method for reproducing data from a data recording field of an optical disk having a sector structure constituted of a header field previously storing address information and a data recording field for storing data, the header field including an address mark field storing an address mark showing a beginning of address information, an address information field storing address information, and an error detection code field storing an error detection code for [detection] *detecting* an error in the address information field, said optical-disk reproducing method comprising:

detecting an address mark stored in the address mark field of the sector; and deciding and controlling a period of reproducing data from the data recording field of the sector;

wherein said deciding and controlling of the data reproducing period uses an address-mark detection timing in deciding and controlling the data reproducing period;

wherein said deciding and controlling of the data reproducing period includes detecting a presence [of] *or* absence of an error in the address information based on the address information and the error detection code, and generating a reproducing timing signal for deciding a data reproducing operation by using the address-mark detection timing and a timing of detecting in said detecting of the presence or absence of an error that there is no error in the address information; and wherein said deciding and controlling of the data reproducing period, when reproducing data from the data recording field of a predetermined sector, permits data reproduction only where address information having no error detected is obtained as a result of error detection in the subject sector executed in said detecting of the presence or absence of an error, and where at least one piece of address information having no error detected is obtained in a predetermined number of sectors preceding the subject sector as a result of error detection and at least one address mark is detected in the address mark field of the subject sector.

14. An optical-disk reproducing method for reproducing data from a data recording field of an optical disk having a sector structure constituted of a header field previously storing address information and a data recording field for storing data, the header field including an address mark field storing an address mark showing a beginning of address information, an address information field storing address information, and an error detection code field storing an error detection code for detecting an error in the address information field, said optical-disk reproducing method comprising:

detecting an address mark stored in the address mark field of the sector; and deciding and controlling a period of reproducing data from the data recording field of the sector;

wherein said deciding and controlling of the data reproducing period uses an address-mark detection timing in deciding and controlling the data reproducing period;

[wherein said deciding and controlling of the data reproducing period uses an address-mark detection timing in deciding and controlling the data reproducing period;]

wherein said deciding and controlling of the data reproducing period includes detecting a presence or absence of an error in the address information based on the address information and the error detection code, and generating a reproducing timing signal for deciding a data reproducing operation by using the address-mark detection timing and a timing of detecting in said detecting of the presence or absence of an error that there is no error in the address information; and [wherein said generating of the reproducing timing signal includes]

*wherein said generating of the reproducing timing signal includes* generating a reference clock serving as a criterion of reproducing data, count-specifying a position in one sector by using the reference clock generated in said generating of the reference clock, correcting the values counted in said count-specifying of the position in one sector with predetermined values at the address-mark detection timing of detecting the address mark and a timing of detecting that there is no error in the address information executed in said detecting of the presence or absence of an error, and decoding the counted value obtained in said count-specifying of the position in one sector corrected with the predetermined values to thereby produce the reproducing-timing signals.

15. The optical-disk reproducing method according to claim 14, wherein said decoding of the counted value decodes the counted value obtained in said count-specifying of the position in one sector to generate an address-mark detection window, and permits the correction of the counted value in said correcting of the counted values when the address-mark detection timing is present within the address-mark detection window, and inhibits said correcting of the counted values from correcting the counted value when the address-mark detection timing is not present within the address-mark detection window.

16. The optical-disk reproducing method according to claim 14, wherein:

the header field in each sector includes a plurality of address fields each having an address mark field, an address information field, and an error detection code field, and when said [detection] *detecting* of the presence or absence of an error detects that there is no error in the address information in at least one address field in each sector, said generating of the timing reproducing signal inhibits the correction of the counted value in said correcting of the counted values even if an address mark is detected in the subsequent address fields thereafter in the subject sector.

17. An information recording system for recording information including transfer-rate-priority data and transfer-rate-nonpriority data in mixture supplied from an external unit to an optical disk having a sector structure constituted of a header field previously storing address information and a data recording field for storing data, said system comprising:

an optical disk drive for recording data to the data recording field in a predetermined sector of the optical disk; and determination means for determining whether the information to be recorded to the optical disk is transfer-rate-priority data or transfer-rate-nonpriority data;

wherein when said determination means determines that the information to be recorded to the optical disk is the transfer-rate-priority data, said optical disk drive is operable to record the information in the sector to record the data even if there are errors equal to or more than a predetermined criterion in address information in the sector to record the data[:]; and wherein when said determination means determines the data is the transfer-rate-nonpriority data, said optical disk drive is operable to record the data in a substitute sector without recording the data in the subject sector to record the data if there are errors equal to or more than the predetermined criterion in the subject sector.

18. The information recording system according to claim 17, wherein:

the header field includes an address mark field storing an address mark showing a beginning of address information, an address information field storing address information, and an error detection code field storing an error detection code for detecting an error in the address information field;

said system further comprises address-mark detection means for detecting an address mark recorded in the address mark field of the subject sector, and data-recording decision and control means for deciding and controlling a period of recording data to the data recording field of the subject sector; and wherein said data-recording decision and control means uses an address-mark detection timing *for* deciding and controlling of the data recording period.

19. The information recording system according to claim 18, wherein said data-recording decision and control means includes:

address-information error detecting means for detecting a presence or absence of an error in the address information based on the address information and the error detection code; and timing generation means for generating a recording timing signal for deciding a data recording operation by using the address mark detection timing and a timing of detecting that there is no error in the address information.

20. The information recording system according to claim 19, wherein said data-recording decision and control means, when recording data in the data recording field of a predetermined sector, determines whether or not the supplied data is the transfer-rate-priority data where address information having no error detected is obtained as a result of error detection in the subject sector executed by said address-information error detection means, and where at least one piece of address information having no error detected is obtained in a predetermined number of sectors preceding the subject sector as a result of executing the address-information error detection by said address-information error detection means and at least one address mark is detected in the address mark field of the subject sector.

21. The information recording system according to claim 17, wherein said determination means determines whether the information is transfer-rate-priority data or transfer-rate-nonpriority data by interpreting whether a command is a command for handling the transfer-rate-priority data or a command for handling the transfer-rate-nonpriority data issued from an external unit to the optical disk drive.

22. The information recording system according to claim 17, wherein said determination means determines whether the information is transfer-rate-priority data or transfer-rate-nonpriority data depending on a content of a set mode set to the optical disk drive from an external unit [(502)] indicating whether the set mode is a mode for handling the transfer-rate-priority data or a mode for handling the transfer-rate-nonpriority data.

23. The information recording system according to claim 17, further comprising a file system for filing the information to be handled, wherein each file is provided with a file attribute showing transfer-rate-priority data or not, and wherein said determination means determines transfer-rate-priority data or transfer-rate-nonpriority data in accordance with the fact that the attribute of each file provided by the file system shows transfer rate priority or transfer rate nonpriority.

24. An information recording method for recording data supplied from an external unit in a data recording field of an optical disk having a sector structure constituted of a header field previously storing address information and a data recording field for storing data, said method comprising:

determining whether or not the information to be recorded to the optical disk is transfer-rate-priority data; and recording the data in the sector to record the data even if there are errors equal to or more than a predetermined criterion in address information in the sector to record the data when the data to be recorded is determined in said determining to be the transfer-rate-priority data, and recording the data in a substitute sector without recording the data in the subject sector to record the data if there are errors equal to or more than the predetermined criterion in the subject sector when the data to be recorded is determined in said determining to be transfer-rate-nonpriority data.

25. The information recording method according to claim 24, wherein:

the header field includes an address mark field storing an address mark showing a beginning of address information, an address information field storing address information, and an error detection code field storing an error detection code for detecting an error in the address information field;

wherein said method further comprises detecting an address mark recorded in the address mark field of the subject sector, and deciding and controlling a period of recording data to the data recording field of the subject sector;

wherein said deciding and controlling of the period of recording data uses an address-mark detection timing *for* deciding and controlling of the data recording period.

26. The information recording method according to claim 25, wherein said deciding and controlling of the data recording period includes:

detecting a presence or absence of an error in the address information based on the address information and the error detection code; and generating a recording timing signal for deciding a data recording operation by using the address mark detection timing and a timing detected in said detecting of the presence or absence of an error for detecting that there is no error in the address information.

27. The information recording method according to claim 26, wherein said deciding and controlling of the data recording period, when recording data in the data recording field of a predetermined sector, determines whether or not the supplied data is the transfer-rate-priority data where address information having no error detected is obtained as a result of error detection in the subject sector executed in said detecting of the presence or absence of an error, and where at least one piece of address information having no error detected is obtained in a predetermined number of sectors preceding the subject sector as a result of executing the address-information error detection and at least one address mark is detected in the address mark field of the subject sector.

28. The information recording method according to claim 24, wherein said determining determines whether the information is transfer-rate-priority data or transfer-rate-nonpriority data by interpreting whether a command is a command for handling the transfer-rate-priority data or a command for handling the transfer-rate-nonpriority data issued from an external unit to the optical disk drive.

29. The information recording method according to claim 24, wherein said determining determines whether the information is transfer-rate-priority data or transfer-rate-nonpriority data depending on a content of a set mode set to the optical disk drive from an external unit indicating whether the set mode is a mode for handling the transfer-rate-priority data or a mode for handling the transfer-rate-nonpriority data.

*30. An information recording method for recording data supplied from an external unit in a data recording field of an optical disk, said method comprising:*

*determining whether or not the data to be recorded to the data recording field is transfer-rate-priority data; and*

*recording the data in the data recording field to record the data even if there are errors equal to or more than a predetermined criterion in address information in the data recording field to record the data when the data to be recorded is determined in said determining to be the transfer-rate-priority data, and recording the data in a substitute field without recording the data in the data recording field to record the data if there are errors equal to or more than the predetermined criterion in the data recording field when the data to be recorded is determined in said determining to be transfer-rate-nonpriority data.*

*31. The information recording method according to claim 30, wherein said determining determines whether the data to be recorded is transfer-rate-priority data or transfer-rate-nonpriority data by interpreting whether a command is a command for handling the transfer-rate-priority data or a command for handling the transfer-rate-nonpriority data issued from an external unit.*

*32. The information recording method according to claim 30, wherein said determining determines whether the data to be recorded is transfer-rate-priority data or transfer-rate-nonpriority data depending on a content of a set mode set from an external unit indicating whether the set mode is a mode for handling the transfer-rate-priority data or a mode for handling the transfer-rate-nonpriority data.*

* * * * *